(12) United States Patent
Cheon et al.

(10) Patent No.: US 12,316,955 B2
(45) Date of Patent: May 27, 2025

(54) FLEXIBLE ELECTRONIC DEVICE, AND METHOD FOR OPERATING CAMERA VIEW SCREEN

(71) Applicant: SAMSUNG ELECTRONICS CO., LTD., Suwon-si (KR)

(72) Inventors: Kawon Cheon, Suwon-si (KR); Doeun Shin, Suwon-si (KR); Jinseon Yoo, Suwon-si (KR); Joayoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 145 days.

(21) Appl. No.: 18/299,941

(22) Filed: Apr. 13, 2023

(65) Prior Publication Data

US 2023/0300451 A1  Sep. 21, 2023

Related U.S. Application Data

(63) Continuation of application No. PCT/KR2021/017620, filed on Nov. 26, 2021.

(30) Foreign Application Priority Data

Nov. 30, 2020 (KR) .................. 10-2020-0164847
Jan. 14, 2021 (KR) .................. 10-2021-0005361

(51) Int. Cl.
*H04N 23/63* (2023.01)
*H04M 1/02* (2006.01)
*H04N 23/60* (2023.01)
*H04N 23/69* (2023.01)

(52) U.S. Cl.
CPC ........ *H04N 23/632* (2023.01); *H04M 1/0235* (2013.01); *H04M 1/0268* (2013.01);
(Continued)

(58) Field of Classification Search
CPC .... H04N 23/632; H04N 23/69; H04N 23/631; H04N 23/695; H04N 23/80;
(Continued)

(56) References Cited

U.S. PATENT DOCUMENTS 7,184,086 B2 *  2/2007  Tamura ................ H04N 23/531
                                                       348/E5.025
8,593,555 B1   11/2013  Chun et al.
(Continued)

FOREIGN PATENT DOCUMENTS

CN    111182213 A    5/2020
CN    111221453 A    6/2020
(Continued)

OTHER PUBLICATIONS

International Search Report for PCT/KR2021/017620 mailed Mar. 2, 2022, 3 pages.

*Primary Examiner* — Padma Haliyur
(74) *Attorney, Agent, or Firm* — Nixon & Vanderhye P.C.

(57) ABSTRACT

An electronic device may include a first housing; a second housing arranged to be slidable with respect to the first housing; a drive device driven to move the second housing with respect to the first housing; a display having a display area, on which visual information is displayed, that can be varied according to the sliding of the second housing with respect to the first housing via the drive device; and a processor operatively connected to the display and the drive device, wherein, during execution of a camera, the processor can perform control to display a camera preview screen through the display area, divide the display area of a second size into a first division area and a second division area on the basis of the sensing of a selection input of a first extension function item for additionally providing a preview screen and the extension of the display area of the display from a first size to the second size, display the camera
(Continued)

preview screen through the first division area, and execute a first extension function corresponding to the selection through the second division area so that a first extension preview screen is displayed.

15 Claims, 29 Drawing Sheets

(52) U.S. Cl.
CPC .............. *H04N 23/60* (2023.01); *H04N 23/69* (2023.01); *H04M 2250/52* (2013.01)

(58) Field of Classification Search
CPC .............. H04M 1/0235; H04M 1/0268; H04M 2250/52; H04M 1/0241
See application file for complete search history.

(56) References Cited

U.S. PATENT DOCUMENTS

| | | |
|---|---|---|
| 9,152,180 B2 | 10/2015 | Kim |
| 10,200,597 B2 | 2/2019 | Choi et al. |
| 10,602,053 B2 | 3/2020 | Manzari et al. |
| 10,747,269 B1 | 8/2020 | Choi et al. |
| 11,243,577 B2 * | 2/2022 | Kim .................. G06F 1/162 |
| 2013/0058063 A1 | 3/2013 | Obrien |
| 2013/0127918 A1 | 5/2013 | Kang et al. |
| 2016/0026219 A1 * | 1/2016 | Kim .................. H04M 1/0245 345/173 |
| 2016/0373654 A1 * | 12/2016 | Kwon .................. G09G 5/373 |
| 2018/0014417 A1 * | 1/2018 | Seo .................. H05K 1/189 |
| 2019/0261519 A1 | 8/2019 | Park et al. |
| 2020/0192529 A1 | 6/2020 | Li et al. |
| 2021/0303027 A1 | 9/2021 | Kim |

FOREIGN PATENT DOCUMENTS

| | | |
|---|---|---|
| KR | 20130056674 A | 5/2013 |
| KR | 20140059274 A | 5/2014 |
| KR | 20140107888 A | 9/2014 |
| KR | 20150060278 A | 6/2015 |
| KR | 20160142172 A | 12/2016 |
| KR | 20160150539 A | 12/2016 |
| KR | 20190101184 A | 8/2019 |

* cited by examiner

FLEXIBLE ELECTRONIC DEVICE, AND METHOD FOR OPERATING CAMERA VIEW SCREEN

CROSS-REFERENCE TO RELATED APPLICATIONS

This application is a continuation of International Application No. PCT/KR2021/017620, designating the United States, filed on Nov. 26, 2021, in the Korean Intellectual Property Receiving Office, and claiming priority to KR Patent Application No. 10-2020-0164847 filed on Nov. 30, 2020, and to KR Patent Application No. 10-2021-0005361 filed on Jan. 14, 2021, in the Korean Intellectual Property Office, the disclosures of all of which are hereby incorporated by reference herein in their entireties.

BACKGROUND

Field

Various embodiments relate to a flexible electronic device including an expandable display, and/or a method for operating a camera view screen.

Description of Related Art

To meet the needs of users who want new and diverse functions, electronic devices are being developed so as to have a structure enabling expansion of a display or improving the usability of the display.

Recently, electronic devices capable of expanding a display are being released. A flexible electronic device may include a flexible display disposed in a space formed by a first housing and a second housing thereof. The flexible display may be expanded or contracted by a sliding motion between the first housing and the second housing. As a result, in a case of the flexible electronic device, an activated area in which visual information is displayed through a display may be reduced or enlarged.

SUMMARY

Electronic devices (e.g., a smartphone) may provide a photographing function enabling photographing of a subject through a camera (or a camera module comprising a camera). Cameras mounted in the electronic devices provide various view modes, but the functions of the modes are not being smoothly used. For example, when a user of an electronic device wants to take a picture by using various camera view modes or an external camera app, the user may have an inconvenience of having to shoot the same scene multiple times by switching screens through mode change.

Accordingly, during photographing by a camera, a flexible electronic device including an expandable display may provide an expansion preview screen corresponding to a preview mode desired by a user in various forms, in addition to a camera preview screen, by using the flexible display.

An electronic device according to various example embodiments may comprise: a first housing; a second housing arranged to be slidable with respect to the first housing; a drive device driven to move the second housing with respect to the first housing; a display having a display area, on which visual information is displayed, that can be varied according to the sliding of the second housing with respect to the first housing via the drive device; and a processor operatively connected, directly or indirectly, to the display and the drive device, wherein, during execution of a camera, the processor can perform control to display a camera preview screen through the display area, divide the display area of a second size into a first division area and a second division area on the basis of the sensing of a selection input of a first extension function item for additionally providing a preview screen and the extension of the display area of the display from a first size to the second size, display the camera preview screen through the first division area, and execute a first extension function corresponding to the selection through the second division area so that a first extension preview screen is displayed . . .

A method for operating a camera preview screen of a flexible electronic device according to various example embodiments may comprise, in response to execution of a camera function, displaying a camera preview screen on a display having a variable display area in which visual information is to be displayed, based on detection, on the preview screen, of a selection input of a first expansion function item for additionally providing a preview function and expansion of the display area of the display from a first size to a second size, dividing the display area of the second size into a first division area and a second division area, and displaying the camera preview screen through the first division area and displaying a first expansion preview screen through the second division area by executing the first expansion function.

According to various example embodiments, during execution of a camera, a flexible electronic device including an expandable display may simultaneously provide a plurality of preview screens corresponding to various preview modes through an expansion area and support simultaneous or separate shooting to provide a user with a convenient and useful camera service according to circumstances.

BRIEF DESCRIPTION OF DRAWINGS

Other aspects, advantages, and prominent features of the disclosure will become clear to those skilled in the art from the following detailed description that discloses various example embodiments together with the accompanying drawings, in which.

DETAILED DESCRIPTION

Figure 1:
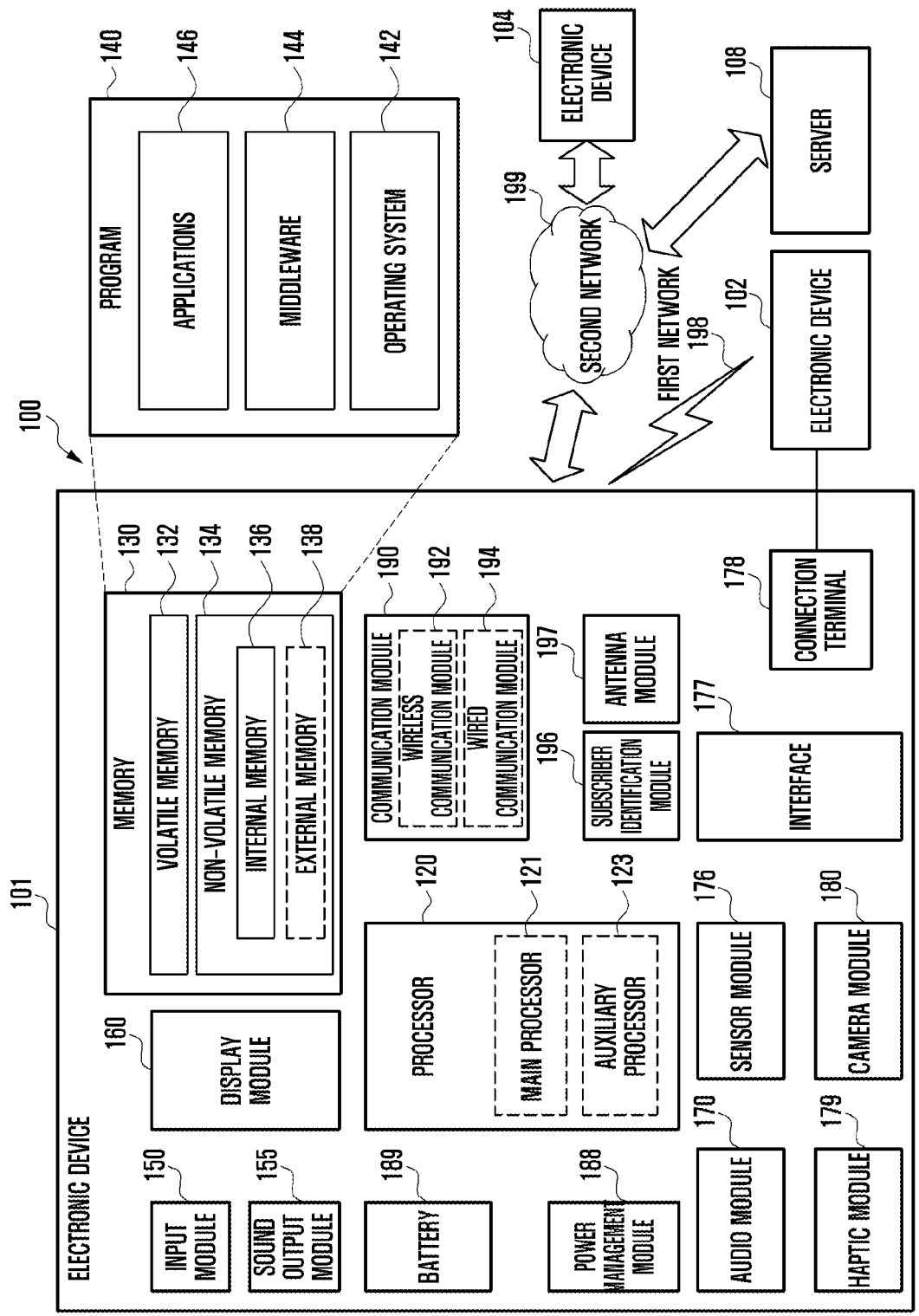
FIG. 1 is a block diagram illustrating an electronic device in a network environment according to an example embodiment.

FIG. 1 is a block diagram illustrating an electronic device 101 in a network environment 100 according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
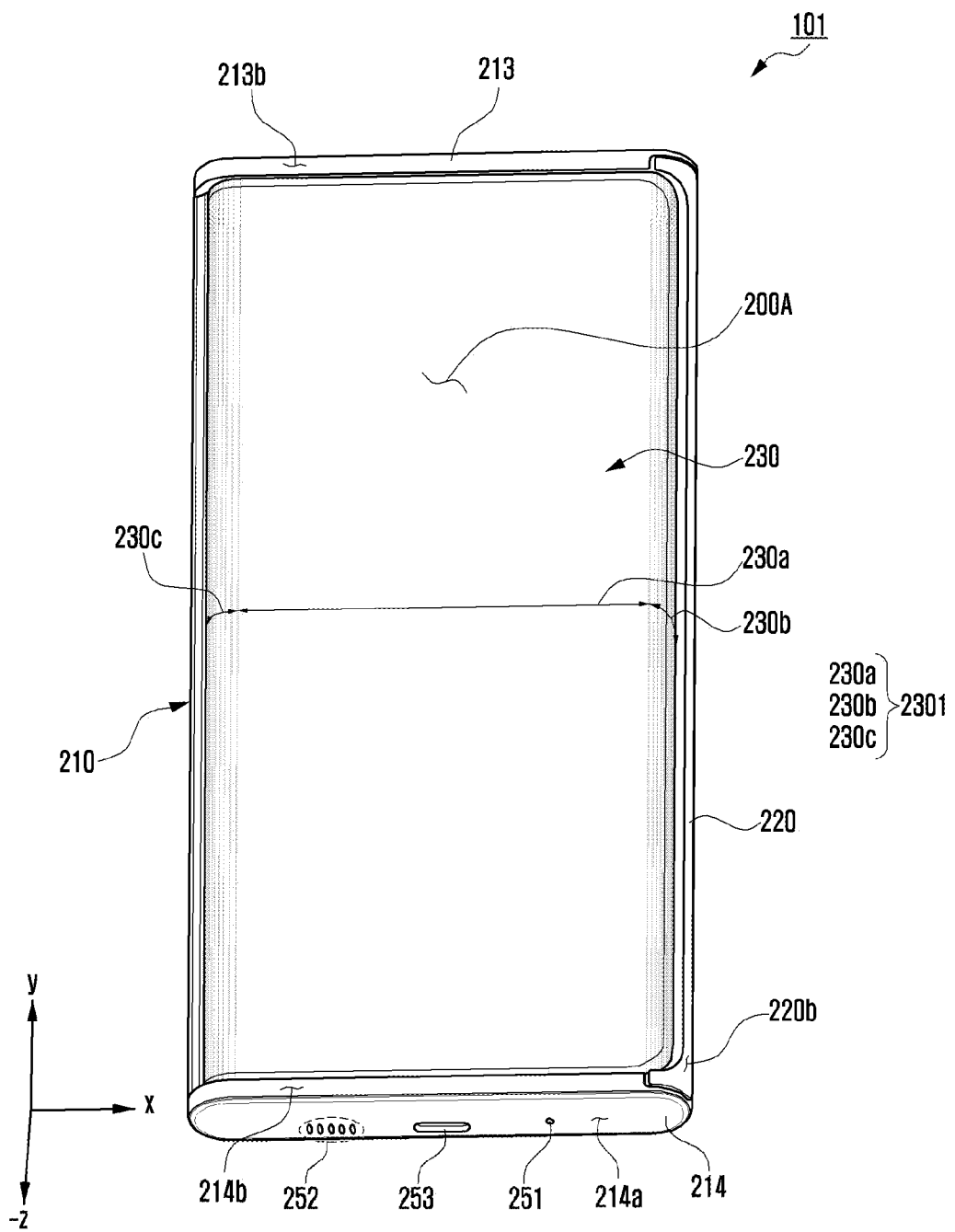
FIG. 2A is a front perspective view of an electronic device 200 in a closed state according to an example embodiment.
Figure 2B:
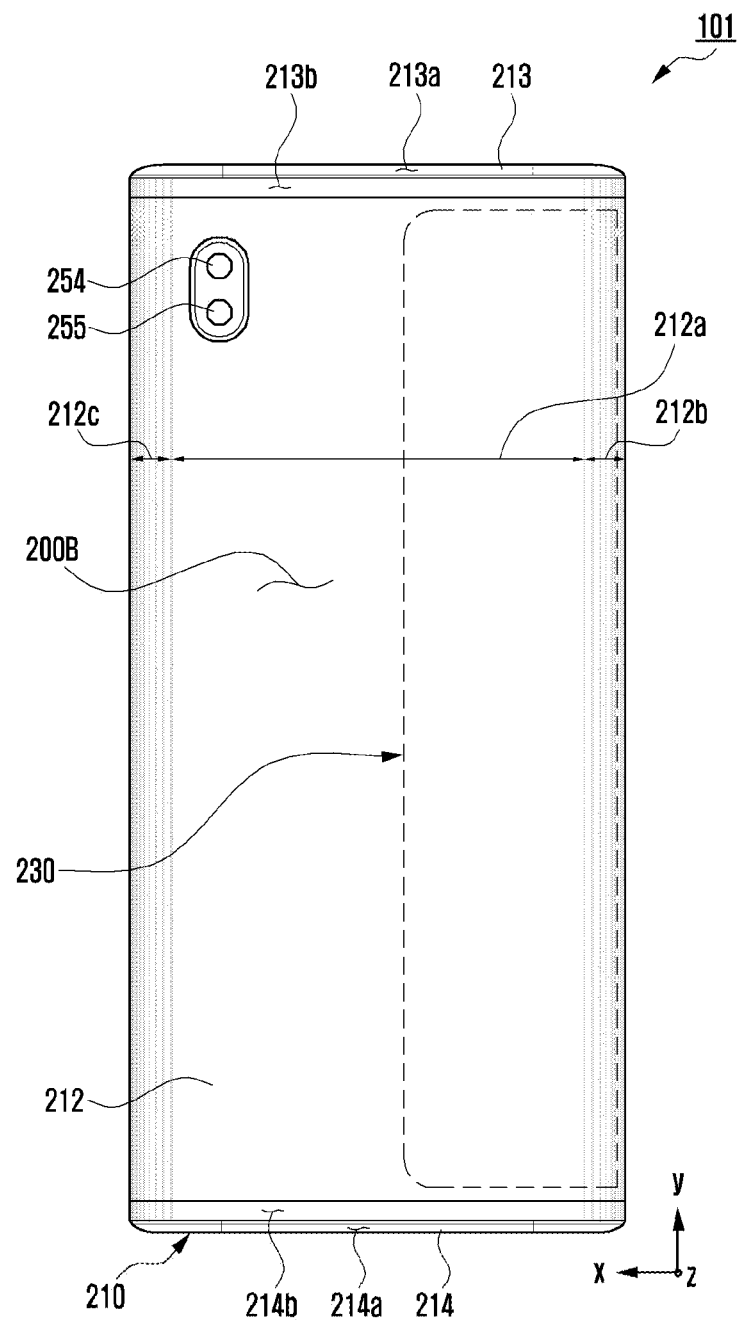
FIG. 2B is a rear perspective view of the electronic device 200 in a closed state according to an example embodiment.
Figure 2C:
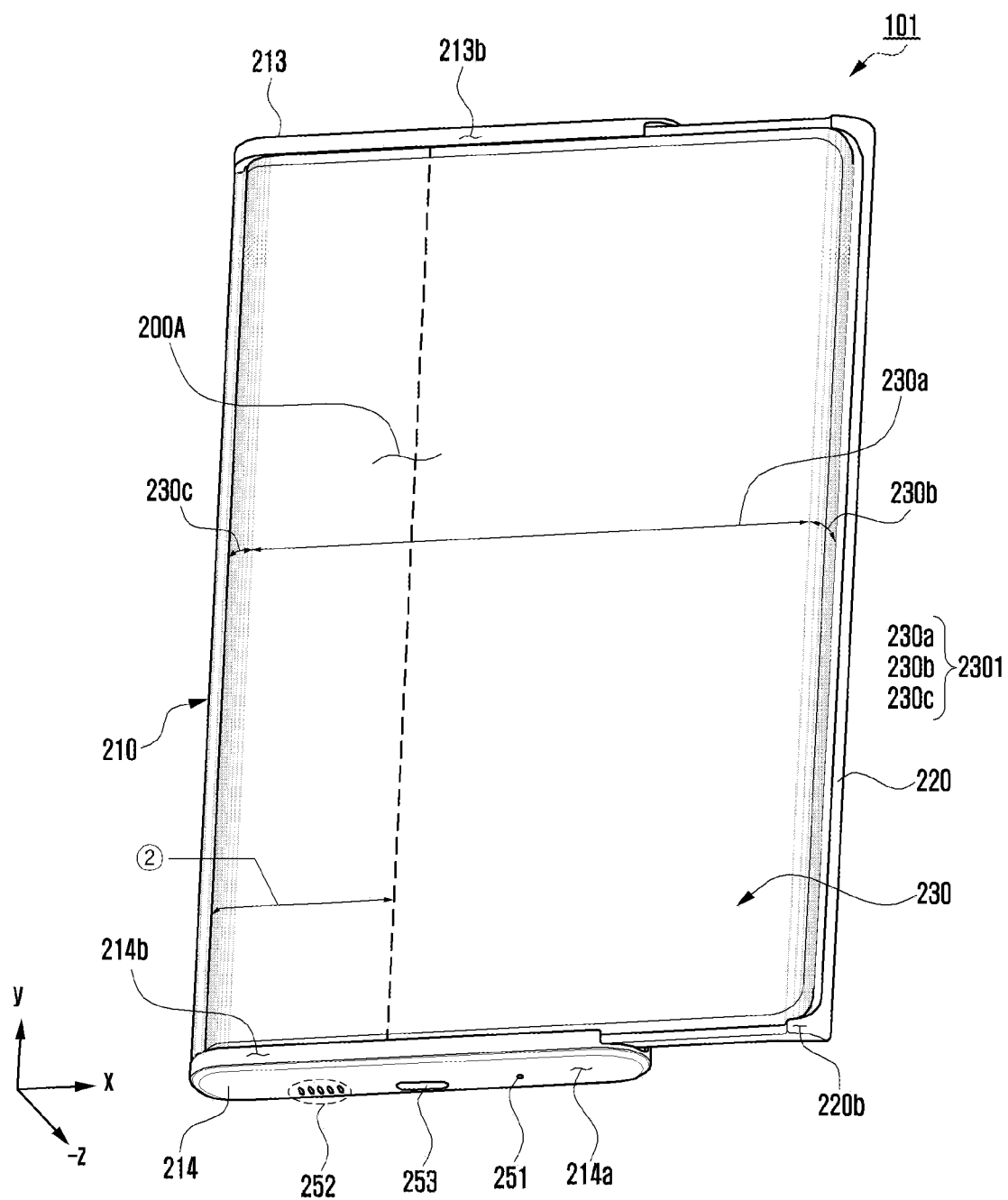
FIG. 2C is a front perspective view of the electronic device 200 in an open state according to an example embodiment.
Figure 2D:
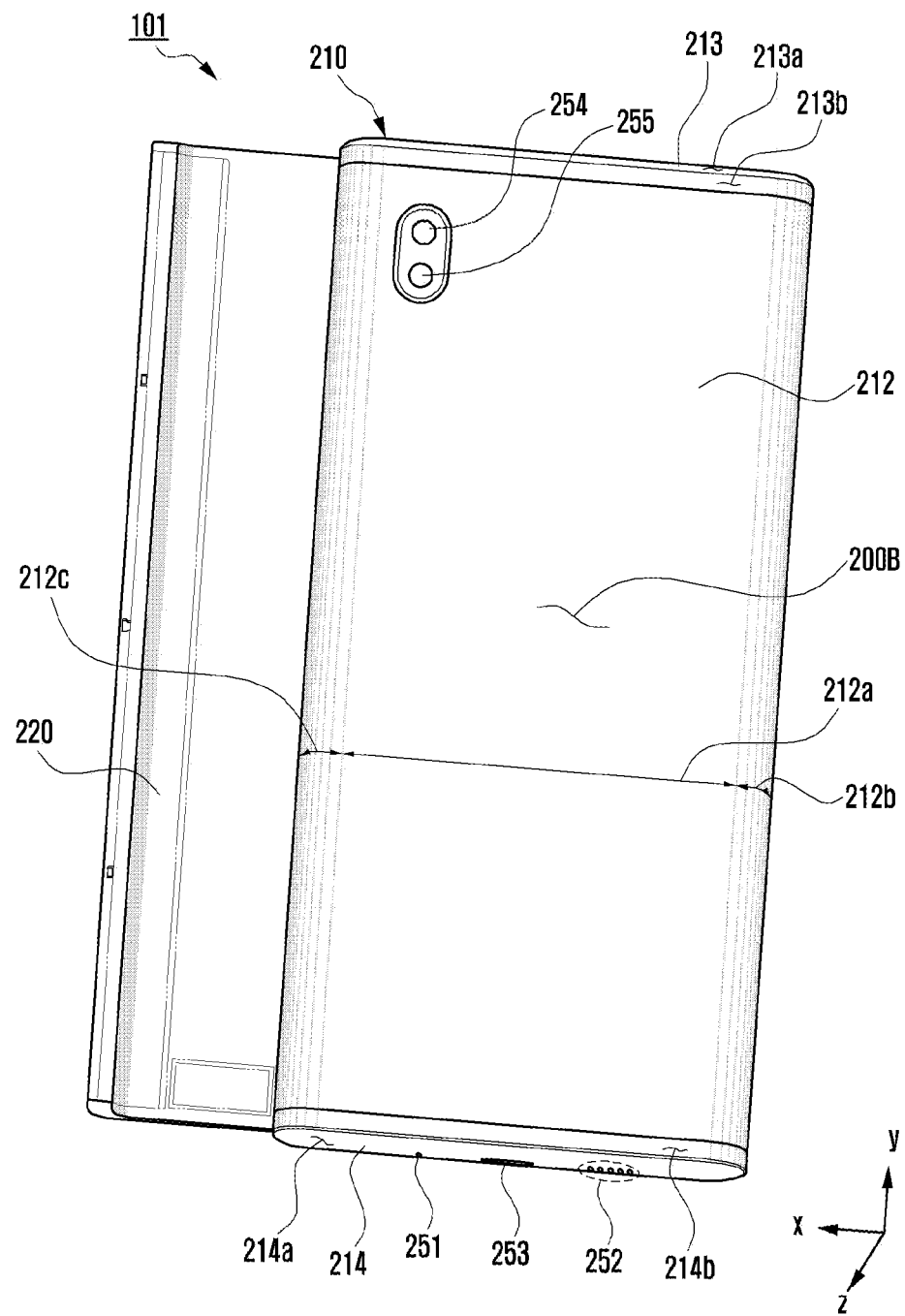
FIG. 2D is a rear perspective view of the electronic device 200 in an open state according to an example embodiment.

FIG. 2A is a front perspective view of an electronic device 200 in a closed state according to an embodiment. FIG. 2B is a rear perspective view of the electronic device 200 in a closed state according to an embodiment. FIG. 2C is a front perspective view of the electronic device 200 in an open state according to an embodiment. FIG. 2D is a rear perspective view of the electronic device 200 in an open state according to an embodiment.

According to various embodiments, the electronic device 200 in FIGS. 2A, 2B, 2C, and 2D may include the electronic device 101 in FIG. 1.

Referring to FIGS. 2A, 2B, 2C, and 2D, in an embodiment, the electronic device 200 may be implemented to expand a screen 2301 in a sliding manner. For example, the screen 2301 may be an area of a flexible device 230 seen to the outside. FIG. 2A and FIG. 2B illustrate the electronic device 200, the screen 2301 of which is not expanded, and FIG. 2C and FIG. 2D illustrate the electronic device 200, the screen 2301 of which is expanded. A state where the screen 2301 is not expanded is a state where a sliding plate 220 for a sliding motion of the display 230 is not slid out, and may be called a "closed state" hereinafter. A state where the screen 2301 is expanded is a maximally expanded state where there is no more expansion of the screen 2301 caused by a slide-out of the sliding plate 220, and may be called an "open state" hereinafter. For example, a slide-out may be at least a partial movement of the sliding plate 220 in a first direction (e.g., a +x-axis direction) when the electronic device 200 is switched from a closed state to an open state. According to various embodiments, the open state may be defined as a state where the screen 2301 is expanded compared to the closed state, and may provide various screen sizes according to a movement position of the sliding plate 220. According to various embodiments, an intermediated state may indicate a state between the closed state of FIG. 2A and the open state of FIG. 2C. The screen 2301 may include an active area of the flexible display 230, which is visually exposed to enable image output, and the electronic device 200 may adjust the active area according to a movement of the sliding plate 220 or a movement of the flexible display 230. In the following description, the open state may indicate a state where the screen 2301 is maximally or highly expanded. In an embodiment, the flexible display 230 that is disposed on the electronic device 200 in FIG. 2A so as to be slidable and provides the screen 2301 may also be called a "slide-out display" or an "expandable display".

According to an embodiment, the electronic device 200 may include a sliding structure related to the flexible display 230. For example, when the flexible display 230 is moved by a configured distance due to external force, a closed state or an open state may be switched to an open state or a closed state with no more external force due to an elastic structure included in the sliding structure (e.g., a semi-automatic sliding operation).

According to an embodiment, when a signal is generated via an input device included in the electronic device 200, the electronic device 200 may be switched from a closed state to an open state, or from an open state to a closed state by a driving device (e.g., the driving device 185 in FIG. 1) such as a motor connected to the flexible display 230. For example, when a signal is generated through a hardware button or a software button provided through the screen, the electronic device 200 may be switched from a closed state to an open state, or from an open state to a closed state.

According to various embodiments, when a signal is generated from various sensors such as a pressure sensor, the electronic device 200 may be switched from a closed state to an open state, or from an open state to a closed state. For example, a squeeze gesture indicating that a part (e.g., the palm or a finger) of a hand presses the electronic device 200 within a designated section thereof may be detected via a sensor when the electronic device 200 is carried or held by the hand, and accordingly, the electronic device 200 may be switched from a closed state to an open state or from an open state to a closed state.

According to an embodiment, the display 230 may include a second section 2 (see FIG. 2C). The second section ② may include an expanded part of the screen 2301 when the closed state of the electronic device 200 is switched to the open state. When the electronic device 200 is switched from a closed state to an open state, the second section ② may slide to be ejected from an internal space of the electronic device 200, and thus the screen 2301 may be expanded. When the electronic device 200 is switched from an open state to a closed state, at least a part of the second section ② may slide to be retracted into the internal space of the electronic device 200, and thus the screen 2301 may be reduced. When the electronic device 200 is switched from an open state to a closed state, at least a part of the second section ② may be bent to be moved into the internal space of the electronic device 200. For example, the flexible display 230 may include a flexible substrate (e.g., a plastic substrate) made of a polymer material including polyimide (PI) or polyester (PET). The second section ② is a part of the flexible display 230 bent when the electronic device 200 is switched between an open state and a closed state, and for example, may be called a bendable section. In the following description, the second section ② will be called a bendable section.

According to an embodiment, the electronic device 200 may include a housing 210, the sliding plate 220, or the flexible display 230.

The housing (or case) 210 may include, for example, a back cover 212, a first side cover 213, or a second side cover 214. The back cover 212, the first side cover 213, or the second side cover 214 may be connected to a support member (not illustrated) positioned in the electronic device 200, and may configure at least a part of an exterior of the electronic device 200.

The back cover 212 may be configure, for example, at least a part of a rear surface 200B of the electronic device 200. In an embodiment, the back cover 212 may be substantially opaque. For example, the back cover 212 may be made of, for example, coated or colored glass, ceramic, polymer, metal (e.g., aluminum, stainless steel (STS), or magnesium), or a combination of two or more of the materials. According to an embodiment, in a state where the bendable section ② of the flexible display 230 is retracted into an interval space of the housing 210 (e.g., a closed state), at least a part of the bendable section ② may be disposed to be visible through the back cover 212 from the outside. In this case, the back cover 212 may be made of a transparent material and/or a translucent material.

According to an embodiment, the back cover 212 may include a flat part 212a and curved parts 212b and 212c positioned on opposite sides of the flat part 212a. The curved parts 212b and 212c are configured to be adjacent to relatively long both edges (not illustrated) of the back cover 212, respectively, and may seamlessly extend by being bent toward the screen positioned opposite to the back cover 212. According to an embodiment, the back cover 212 may be implemented to include one of the curved parts 212b and 212c or implemented without the curved parts 212b and 212c.

According to an embodiment, the first side cover 213 and the second side cover 214 may be positioned opposite to each other. For example, the first side cover 213 and the second side cover 214 may be positioned on opposite sides of the flexible display 230 in a second direction (e.g., a y-axis direction) orthogonal to the first direction (e.g., the +x-axis direction) of a slide-out of the sliding plate 220. The first side cover 213 may configure at least a part of a first side surface 213a of the electronic device 200, and the second side cover 214 may configure at least a part of a second side surface 214a of the electronic device 200 oriented in a direction opposite to the first side surface 213a. The first side cover 213 may include a first border part (or a first rim) 213b extending from an edge of the first side surface 213a. For example, the first border part 213b may configure at least a part of a one-side bezel of the electronic device 200. The second side cover 214 may include a second border part (or a second rim) 214b extending from an edge of the second side surface 214a. For example, the second border part 214b may configure at least a part of the other-side bezel of the electronic device 200. According to an embodiment, in a closed state of FIG. 2A, a surface of the first border part 213b, a surface of the second border part 214b, and a surface of the sliding plate 220 may be connected smoothly to configure a one-side curved part (not illustrated) corresponding to a first curved part 230b of the screen 2301. According to various embodiments, the surface of the first border part 213b or the surface of the second border part 214b may include the other-side curved part (not illustrated) corresponding to a second curved part 230c of the screen 2301 positioned opposite to the first curved part 230b . . .

According to an embodiment, the sliding plate 220 may perform a sliding motion on a support member (not illustrated) positioned in the electronic device 200. At least a part of the flexible display 230 may be disposed on the sliding plate 220, and the closed state of FIG. 2A or the open state of FIG. 2C may be made based on the position of the sliding plate 220 on the support member. According to an embodiment, the flexible display 230 may be attached to the sliding plate 120 through a bonding member (or an adhesive member) (not illustrated). According to an embodiment, the bonding member may include a thermo-reactive bonding member, a photo-reactive bonding member, a normal bonding agent, and/or double-sided tape. According to an embodiment, the flexible display 230 may be inserted into a recess disposed on the sliding plate 220 in a sliding manner and disposed on and fixed to the sliding plate 220. The sliding plate 220 functions to support at least a part of the flexible display 230, and in an embodiment, may be called a display support structure.

According to an embodiment, the sliding plate 220 may include a third border part 220b configuring an outer surface (e.g., a surface exposed to the outside to configure an exterior of the electronic device 200) of the electronic device 200. For example, the third border part 220b may configure a bezel around the screen together with the first border part 213b and the second border part 214b in the closed state of FIG. 2A. The third border part 220b may extend in the second direction (e.g., the y-axis direction) to connect one end of the first side cover 213 and one end of the second side cover 214 in a closed state. For example, in the closed state of FIG. 2A, a surface of the third border part 220b may be smoothly connected to the surface of the first border part 213b and/or the surface of the second border part 214b.

According to an embodiment, due to a slide-out of the sliding plate 220, at least a part of the bendable section ② may exit from the inside of the electronic device 200, and thus an expanded state (e.g., an open state) of the screen 2301 as shown in FIG. 2C may be provided.

According to an embodiment, in the closed state of FIG. 2A, the screen 2301 may include a flat part 230*a* and the first curved part 230*b* and/or the second curved part 230*c* positioned on opposite sides of the flat part 230*a*. For example, the first curved part 230*b* and the second curved part 230*c* may be substantially symmetrical with respect to the flat part 230*a*. For example, in the closed state of FIG. 2A, the first curved part 230*b* and/or the second curved part 230*c* may be positioned to correspond to the curved parts 212*b* and 212*c* of the back cover 212, respectively, and may be bent toward the back cover 212. When the closed state of FIG. 2A is switched to the open state of FIG. 2C, the flat part 230*a* may be expanded. For example, a partial area of the bendable section ② configuring the second curved part 230*c* in the closed state of FIG. 2A may be included in the expanded flat part 230*a* when the closed state of FIG. 2A is switched to the open state of FIG. 2C, and may be configured as a different area of the bendable section 2.

According to an embodiment, the electronic device 200 may include an opening (not illustrated) for retracting or ejecting the bendable section ② and/or a pulley (not illustrated) positioned at the opening. The pulley may be positioned to correspond to the bendable section ②, and a movement of the bendable section ② and a movement direction thereof may be guided through rotation of the pulley during switching between the closed state of FIG. 2A and the open state of FIG. 2C. The first curved part 230*b* may be configured to correspond to a curved surface on one surface of the sliding plate 220. The second curved part 230*c* may be configured by a part corresponding to a curved surface of the pulley in the bendable section ②. The first curved part 230*b* is positioned opposite to the second curved part 230*c* in a closed state or an open state of the electronic device 200 so as to improve the beauty of the screen 2301. According to an embodiment, the expanded flat part 230*a* may be implemented without the first curved part 230*b*.

According to an embodiment, the flexible display 230 may further include a touch sensing circuit (e.g., a touch sensor). According to various embodiments (not illustrated), the flexible display 230 may be coupled to or disposed to be adjacent to a touch sensing a pressure sensor capable of measuring the strength (pressure) of a touch, and/or a digitizer that detects an input device (e.g., a stylus pen) using a magnetic field scheme. For example, the digitizer may include a coil member disposed on a dielectric substrate to detect an electromagnetic induction type resonant frequency applied from a pen input device.

According to an embodiment, the electronic device 200 may include a microphone hole 251 (e.g., the input module 150 in FIG. 1), a speaker hole 252 (e.g., the sound output module 155 in FIG. 1), a connector hole 253 (e.g., the connection terminal 178 in FIG. 1), a camera module 254 (e.g., the camera module 180 in FIG. 1), or a flash 255. According to various embodiments, the flash 255 may be implemented to be included in the camera module 254. In an embodiment, the electronic device 200 may omit at least one of elements or additionally include other elements.

The microphone hole 251 may be, for example, configured on at least a part of the second side surface 214*a* to correspond to a microphone (not illustrated) positioned in the electronic device 200. The position of the microphone hole 251 may be various without being limited to the embodiment of FIG. 2*a*. According to an embodiment, the electronic device 200 may include multiple microphones capable of detecting the direction of a sound.

The speaker hole 252 may be, for example, configured on at least a part of the second side surface 214*a* to correspond to a speaker positioned in the electronic device 200. The position of the speaker hole 252 may be various without being limited to the embodiment of FIG. 2*a*. According to various embodiments, the electronic device 200 may include a call receiver hole. In an embodiment, the microphone hole 251 and the speaker hole 252 may be implemented as one hole, or the speaker hole 252 may be omitted like a piezo speaker.

The connector hole 253 may be, for example, configured on at least a part of the second side surface 214*a* to correspond to a connector (e.g., a USB connector) positioned in the electronic device 200. The electronic device 200 may transmit and/or receive power and/or data with an external electronic device electrically connected to the connector through the connector hole 253. The position of the connector hole 253 may be various without being limited to the embodiment of FIG. 2*a*.

The camera module 254 and the flash 255 may be positioned on, for example, the rear surface 200B of the electronic device 200. The camera module 154 may include one or multiple lenses, an image sensor, and/or an image signal processor. The flash 255 may include, for example, a light emitting diode or a xenon lamp. In an embodiment, two or more lenses (an infrared camera, and wide-angle and telephoto lenses) and image sensors may be positioned on one surface of the electronic device 200. According to various embodiments, without being limited to the embodiment of FIG. 2B or FIG. 2D, the electronic device 200 may include multiple camera modules. The camera module 254 may be one of the multiple camera modules. For example, the electronic device 200 may include multiple camera modules (e.g., a dual camera or a triple camera) having different attributes (e.g., a field of view) or functions. For example, there may be multiple camera modules (e.g., the camera module 254) including lenses having different fields of view, and the electronic device 200 may control to change the field of view of a camera module performed in the electronic device 200, based on a user's selection. In addition, multiple camera modules may include at least one of a wide-angle camera, a telephoto camera, a color camera, a monochrome camera, or an infrared (IR) camera (e.g., a time-of-flight (TOF) camera, or a structured light camera). According to an embodiment, the IR camera may be operated as at least a part of a sensor module (not illustrated).

According to various embodiments (not illustrated), the electronic device 200 may further include a camera module (e.g., a front camera) that generates an image signal, based on light received through one surface (e.g., a front surface 200A) of the electronic device 200 placed in a direction the screen 2301 faces. For example, the camera module 254 may not be limited to the embodiment of FIG. 2B or FIG. 2D, and may be positioned in the housing 210 in alignment with an opening (e.g., a through hole or a notch) configured on the flexible display 230. The camera module 254 may receive light through the opening and a partial area of a transparent cover overlapping with the opening, to generate an image signal. The transparent cover functions to protect the flexible display 230 from the outside, and for example, may include a material such as polyimide or ultra-thin class (UTG).

According to an embodiment, without being limited to the embodiment of FIG. 2B or FIG. 2D, the camera module 254 may be disposed under at least a part of the screen 2301 of the flexible display 230, and may perform a relevant function (e.g., image capturing) without visual distinguishment (or exposure) of the position of the camera module 254. In this case, for example, when viewed from above the screen 2301 (e.g., when view in the −z-axis direction), the camera module 254 may be disposed to overlap with at least a part of the screen 2301 and thus may obtain an image of an external object without being exposed to the outside.

According to various embodiments (not illustrated), the electronic device 200 may further include a key input device (e.g., the input module 150 in FIG. 1). The key input device may be, for example, positioned on the first side surface 213a of the electronic device 200 configured by the first side cover 213. In an embodiment (not illustrated), the key input device may include at least one sensor module.

According to various embodiments (not illustrated), the electronic device 200 may include various sensor modules (e.g., the sensor module 176 in FIG. 1). The sensor module may generate an electrical signal or a data value corresponding to an internal operation state or an external environment state of the electronic device 200. For example (not illustrated), the sensor module may include a proximity sensor that generates a signal related to proximity of an external object, based on light received through the front surface 200A of the electronic device 200 placed in a direction the screen 2301 faces. As another example (not illustrated), the sensor module may include various biometric sensors, such as a fingerprint sensor or an HRM sensor for detecting biometric information, based on light received through the front surface 200A or the rear surface 200B of the electronic device 200. The electronic device 200 may include at least one of various other sensor modules, for example, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

According to various embodiments, without being limited to the embodiment of FIG. 2A, FIG. 2B, FIG. 2C, and FIG. 3, the electronic device 200 may be implemented in a structure the screen is expanded at the third border part 220b when the sliding plate 220 is slid out. For example, a partial area of the flexible display 230 configuring the first curved part 230b in the closed state of FIG. 2A may be included in the expanded flat part 230a when the closed state of FIG. 2A is switched to the open state of FIG. 2C, and may be configured as a different area of the flexible display 230.

Figure 3:
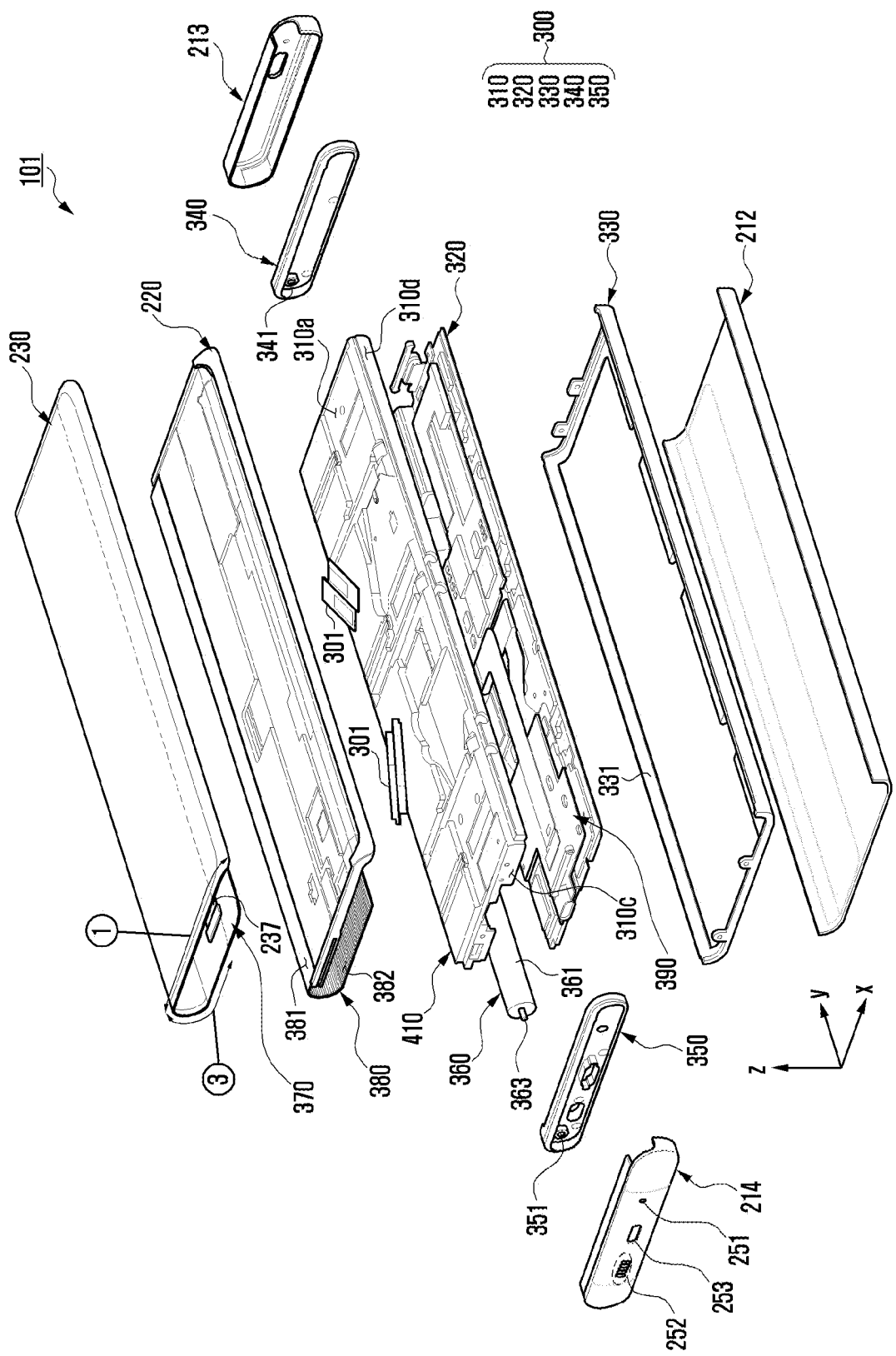
FIG. 3 is an exploded perspective view of the electronic device 101 in FIG. 2A according to an example embodiment.

FIG. 3 is an exploded perspective view of the electronic device 101 in FIG. 2A according to an embodiment.

Referring to FIG. 3, in an embodiment, the electronic device 101 may include a back cover 212, a first side cover 213, a second side cover 214, a support member assembly 300, a pulley 360, a sliding plate 220, a flexible display 230, a support sheet 370, a multi-bar structure (or multi-bar assembly) 380, or a printed circuit board 390 (for example, printed circuit board (PCB), flexible PCB (FPCB), or rigid-flexible PCB (RFPCB)). Repeated descriptions of some of the reference numerals in FIG. 3 will be omitted.

According to an embodiment, the support member assembly (or support structure) 300 may be a frame structure capable of enduring a load, and may contribute to the durability or rigidity of the electronic device 101. At least a part of the support member assembly 300 may include a nonmetal material (for example, polymer) or a metal material. The housing 210 (refer to FIG. 2A) including the back cover 212, the first side cover 213, or the second side cover 214, the pulley 360, the sliding plate 220, the flexible display 230, the support sheet 370, the multi-bar structure 380, or the printed circuit board 390 may be disposed on or coupled to the support member assembly 300.

According to an embodiment, the support member assembly 300 may include a first support member 310, a second support member 320, a third support member 330, a fourth support member 340, or a fifth support member 350.

The first support member (or first bracket) 310 may have the shape of a plate, for example. The sliding plate 220 may be disposed on a surface 410a of the first support member 310. The second support member (or second bracket) 320 may have the shape of a plate overlapping at least a part of the first support member 310 when seen in the z-axis direction, for example, or may be coupled to the first support member 310 and/or the third support member 330. The second support member 320 may be positioned between the first support member 310 and the third support member 330. The third support member 330 may be coupled to the first support member 310 and/or the second support member 320 with the second support member 320 interposed therebetween. The printed circuit board 390 may be disposed on the second support member 320 between at least the first support member 310 and the second support member 320. The fourth support member 340 may be coupled to one side of an assembly (or structure) (not illustrated) to which the first support member 310, the second support member 320, and the third support member 430 are coupled. The fifth support member 350 may be coupled to another side of the assembly (or structure) (not illustrated) to which the first support member 310, the second support member 320, and the third support member 330 are coupled, and may be positioned on the opposite side to the fourth support member 340. The first side cover 213 may be coupled to the support member assembly 300 from the fourth support member 340 side. The second side cover 214 may be coupled to the support member assembly 300 from the fifth support member 350 side. The back cover 212 may be coupled to the support member assembly 300 from the third support member 330 side. At least a part of the first support member 310, the second support member 320, the third support member 330, the fourth support member 340, or the fifth support member 350 may include a metal material and/or a nonmetal material (for example, polymer). According to various embodiments, at least two of the first support member 310, the second support member 320, the third support member 430, the fourth support member 340, and the fifth support member 350 may be implemented integrally. According to some embodiments, the support member assembly 300 may refer to a structure forming at least some of the first support member 310, the second support member 320, the third support member 330, the fourth support member 340, and the fifth support member 350. According to some embodiments, some of the first support member 310, the second support member 320, the third support member 330, the fourth support member 340, and the fifth support member 350 may be omitted.

The first support member 310 may include, for example, a first side surface (not illustrated) facing the fourth support member 350, a second side surface 410c which faces the fifth support member 350, and which is positioned opposite to the first side surface, a third side surface (not illustrated) connecting one end of the first side surface and one end of the second side surface 310c, or a fourth side surface 310d which connects the other end of the first side surface and the other end of the second side surface 310c, and which is positioned opposite to the third side surface. According to an embodiment, the pulley 360 may be positioned near the third side surface of the first support member 310. As another example, in the case of an electronic device having an opposite sliding-out direction, the pulley 360 may be positioned near the fourth side surface 310*d* of the first support member 360. The pulley 360 may include a roller 361 having the shape of a cylinder extending in a direction from the fifth support member 350 toward the fourth support member 350 (for example, in the +y axis direction). The pulley 360 may include a first rotation shaft (not illustrated) and a second rotation shaft 363, which are connected to the roller 361. The first rotation shaft and the second rotation shaft 363 may be positioned on opposite sides with the roller 361 interposed therebetween. The first rotation shaft may be positioned between the roller 361 and the first side cover 213, and may be connected to the fourth support member 350. The second rotation shaft 363 may be positioned between the roller 361 and the second side cover 214, and may be connected to the fifth support member 350. The fourth support member 350 may include a first through-hole 341 into which the first rotation shaft is inserted, and the fifth support member 350 may include a second through-hole 351 into which the second rotation shaft 363 is inserted. The roller 361 may be able to rotate based on the first rotation shaft disposed on the fourth support member 350 and the second rotation shaft 363 disposed on the fifth support member 350.

According to an embodiment, the sliding plate 220 may be disposed on the support member assembly 300 to be able to slide on the first support member 310. For example, a sliding structure may be provided between the first support member 310 and the sliding plate 220 in order to support and guide coupling therebetween and movements of the sliding plate 220. According to an embodiment, the sliding structure may include at least one elastic structure 301. If the sliding plate 220 is moved to a configured distance by an external force, the at least one elastic structure 301 may switch from the closed state in FIG. 2A to the open state in FIG. 2C, or from the open state to the closed state, even without an additional external force. The at least one elastic structure 301 may include various elastic members such as a torsion spring, for example. For example, as the elastic structure 301, the torsion spring may include one end connected to the sliding plate 220, the other end connected to the first support member 310, and a spring portion between the one end and the other end. If the sliding plate 220 is moved by an external force to a configured distance in a first direction (for example, in the +x axis direction) in which the same slides out, the position of the one end is changed with regard to the other end, and the sliding plate 200 thus may be moved in the first direction by the elastic force form the spring portion, without any additional external force, thereby switching from the closed state in FIG. 2A to the open state in FIG. 2C. If the sliding plate 220 is moved by an external force to a configured distance in a second direction (for example, in the −x axis direction) opposite to the first direction, the position of the one end is changed with regard to the other end, and the sliding plate 220 thus may be moved in the second direction by the elastic force form the spring portion, without any additional external force, thereby switching from the open state in FIG. 2C to the closed state in FIG. 2A.

According to various embodiments, the housing 210 may be defined to further include at least a part of the support member assembly 300. For example, the housing 210 may include a surface (for example, a surface 410*a* formed by the first support member 310) facing in a first direction (for example, in the +z axis direction), and another surface (for example, rear surface 101B in FIG. 2B) facing in a second direction (for example, in the −z axis direction) opposite to the first surface 410*a*. A display support surface 220 may be disposed on a surface (for example, a surface 410*a* formed by the first support member 310) of the housing 210 to be able to slide in a third direction (for example, in the x axis direction) perpendicular to the first direction. According to an embodiment, the flexible display 230 may include a first section ① extending from a bendable section ②. The first section ① may be disposed on the sliding plate 220. When switching from the closed state in FIG. 2A to the open state in FIG. 2C, the first section ① and the bendable section May 2 may move outwards as if sliding as a result of the sliding of the sliding plate 220, thereby expanding the screen (refer to the screen 2301 in FIG. 2C). When switching from the open state in FIG. 2C to the closed state in FIG. 2A, the bendable section ② may at least partially move into the electronic device 101 as a result of the sliding of the sliding plate 220, thereby reducing the screen (refer to the screen 2301 in FIG. 2A). The support member assembly 300 may include an opening (not illustrated) for an inward or outward movement of the bendable section 2, and the pulley 360 may be positioned in the opening. The opening includes a gap between the first support member 310 and the third support member 430, and a part 431 of the third support member 430 adjacent to the opening may have a curved shape corresponding to the curved surface of the roller 461. The pulley 360 may be positioned so as to correspond to the bendable section ②, and the pulley 360 may be rotated by a movement of the bendable section ② while switching between the closed state in FIG. 2A and the open state in FIG. 2C.

According to an embodiment, the support sheet 370 may be attached to the back surface of the flexible display 230. The back surface of the flexible display 230 may refer to a surface positioned opposite to a surface through which light is emitted from a display panel including multiple pixels. The support sheet 370 may contribute to the durability of the flexible display 230. The support sheet 370 may reduce the influence exerted on the flexible display 230 by a load or stress that may occur while switching between the closed state in FIG. 2A and the open state in FIG. 2C. The support sheet 370 may prevent or reduce the flexible display 230 from being damaged by a force resulting from a movement of the sliding plate 220. Although not illustrated, the flexible display 230 may include a first layer including multiple pixels and a second layer coupled to the first layer. The first layer may include a light-emitting layer (for example, display panel) including multiple pixels implemented by a light-emitting element such as an organic light emitting diode (OLED) or a micro light emitting diode (LED), for example, and various other layers (for example, an optical layer for improving the screen image quality or improving the outdoor visibility, such as a polarizing layer). According to an embodiment, the optical layer may selectively transmit light which is generated by the light source of the light-emitting layer, and which vibrates in a predetermined direction. According to an embodiment, when seen from above the screen 2301 (for example, when seen in the −z axis direction), no pixels may be disposed in a partial area of the flexible display 230 at least partially overlapping at least one electronic component (for example, camera module or sensor module) included in the electronic device 101. According to some embodiments, when seen from above the screen 2301, a partial area of the flexible display 230 at least partially overlapping at least one electronic component (for example, camera module or sensor module) included in the electronic device 101 may include a pixel structure and/or a wire structure different from those of other areas. For example, a partial area of the flexible display 230 at least partially overlapping at least one electronic component (for example, camera module or sensor module) included in the electronic device 101 may have a pixel density different from those of other areas. For example, a partial area of the flexible display 230 at least partially overlapping at least one electronic component (for example, camera module or sensor module) included in the electronic device 101 may be implemented as a substantially transparent area formed by changing the pixel structure and/or the wire structure, although no opening is included. The second layer may include various layers for a role of supporting and protecting the first layer (for example, cushion), a role of blocking light, a role of absorbing or blocking electromagnetic waves, or a role of diffusing, dispersing, or radiating heat. According to an embodiment, at least a part of the second layer may be a conductive member (for example, metal plate) used to help reinforce the rigidity of the electronic device 101, to block peripheral noise, and to disperse heat radiated from a peripheral heat-radiating component (for example, display driving circuit). According to an embodiment, the conductive member may include at least one of copper (Cu), aluminum (Al), stainless steel (SUS), or CLAD (for example, laminated member having SUS and Al disposed alternately.

The support sheet 370 may be attached to the back surface of the second layer while covering at least a part of the second layer of the flexible display 230. The support sheet 370 may be made of various metal materials and/or non-metal materials (for example, polymer). According to an embodiment, the support sheet 370 may include stainless steel. According to some embodiments, the support sheet 370 may include engineering plastic. According to some embodiments, the support sheet 370 may be implemented integrally with the flexible display 230. According to an embodiment, the support sheet 370 may include a lattice structure (not illustrated) at least partially overlapping a part of the flexible display 230, which is bent and disposed (for example, bendable section ② in FIG. 2C or FIG. 3 (first curved portion 230b in FIG. 2A or FIG. 2C)). The lattice structure may include multiple openings or multiple slits and may contribute to bendability of the flexible display 230. According to some embodiments, the support sheet 370 may include a recess pattern (not illustrated) including multiple recesses, instead of the lattice structure, and the recess pattern may contribute to bendability of the flexible display 230. According to some embodiments, the lattice structure or the recess pattern may be expanded as at least a part of the planar portion 230a in FIG. 2A or FIG. 2C. According to some embodiments, the support sheet 370 including a lattice structure or a recess pattern, or a conductive member corresponding thereto may include multiple layers.

According to an embodiment, the multi-bat structure 380 may be connected to the sliding plate 220, and may include a first surface 381 facing the support sheet 370 and a second surface 382 positioned opposite to the first surface 381. When the sliding plate 220 moves, the movement and direction of the multi-bar structure 380 may be guided by the roller 361 which rotates through friction with the second surface 382. According to an embodiment, the second surface 382 may include multiple bars (not illustrated) arranged so as to extend in the direction from the second rotation shaft 363 of the pulley 360 to the first rotation shaft (not illustrated) (for example, in the +y axis direction). The multi-bar structure 380 may have bent parts between the multiple bars, which have relatively small thicknesses. In various embodiment, such a multi-bar structure 380 may also be termed a "flexible track" or a "hinge rail".

According to an embodiment, in the closed state in FIG. 2A or in the open state in FIG. 2C, at least a part of the multi-bar structure 380 may be positioned to overlap the screen 2301 (refer to FIG. 2A or FIG. 2C) and may support the bendable section ② such that the bendable section ② of the flexible display 230 remains smoothly connected to the first section ① of the flexible display 230 without detaching. The multi-bar structure 380 may contribute to a movement of the bendable section ② while remaining smoothly connected to the first section ① without detaching, when switching between the closed state in FIG. 2A and the open state in FIG. 2C.

According to an embodiment, the support sheet 370 may be configured such that elements (for example, multi-bar structure 380) positioned inside the electronic device 101 are substantially invisible through the flexible display 230.

When the screen is expanded (for example, in the open state in FIG. 2C), an unsmooth screen may be provided due to detachment resulting from elasticity of the flexible display 230 and/or the support sheet 370. According to some embodiments, in order to prevent or reduce this, a tension structure (not illustrated) regarding the flexible display 230 and/or the support sheet 370 may be provided. The tension structure may contribute to smooth sliding movements while maintaining tension.

According to an embodiment, on the printed circuit board 390, a processor (for example, processor 120 in FIG. 1), a memory (for example, memory 130 in FIG. 1), and/or an interface (for example, interface 177 in FIG. 1) may be mounted. The processor may include, for example, one or more among a central processing device, an application processor, a graphic processing device, an image signal processor, a sensor hub processor, or a communication processor.

The electronic device 101 may include various other elements disposed on the printed circuit board 390 or electrically connected to the printed circuit board 390. For example, the electronic device 101 may include a battery (not illustrated) positioned between the first support member 310 and the second support member 320 or between the second support member 320 and the back cover 212. The battery (not illustrated) is a device for supplying electric power to at least one component of the electronic device 101 and may include, for example, a primary battery which is not rechargeable, a secondary battery which is rechargeable, or a fuel cell. The battery (not illustrated) may be disposed integrally inside the electronic device 101 or may be disposed to be attachable to/detachable from the electronic device 101. According to an embodiment, the electronic device 101 may include an antenna (not illustrated) positioned between the first support member 310 and the second support member 320 or between the second support member 320 and the back cover 212. The antenna (not illustrated) may include, for example, a near field communication (NFC) antenna, a wireless charging antenna, and/or a magnetic secure transmission (MST) antenna. The antenna (not illustrated) may perform short-range communication with an external device, for example, or may transmit/receive wirelessly electric power necessary for charging. In another embodiment, an antenna structure may be formed by a part or a combination or the first side cover 213 and/or the second side cover 214.

According to an embodiment, the electronic device 101 may include a flexible printed circuit board (FPCB) 237 configured to electrically connect the flexible display 230 and the printed circuit board 390. For example, the flexible printed circuit board 237 may be electrically connected, directly or indirectly, to the printed circuit board 390 through an opening (not shown) formed through the sliding plate 220 and an opening (not shown) formed through the first support member 310.

Hereinafter, various structures to which the electronic device 101 is applied will be described.

The electronic device 101 according to various embodiments may have various types of housing structures to mount a flexible display thereon. Electronic devices may have a slidable (or rollable) housing that allows at least a portion of the flexible display to be wound around or unwound from a drive device (e.g., a roller unit, a rotation assembly, a sliding motor) formed in an inner space of the electronic device. Hereinafter, the term "state" may refer to a structural form, pattern, or shape of an electronic device (or a display).

FIGS. 4A to 4F illustrate a structure of an expandable display of an electronic device according to various embodiments.

Referring to FIGS. 4A to 4F, according to various embodiments, an electronic device (e.g., the electronic device 101 in FIG. 1) may have a housing structure in which a display may expand in at least one of up, down, left, and right directions.

Figure 4A:
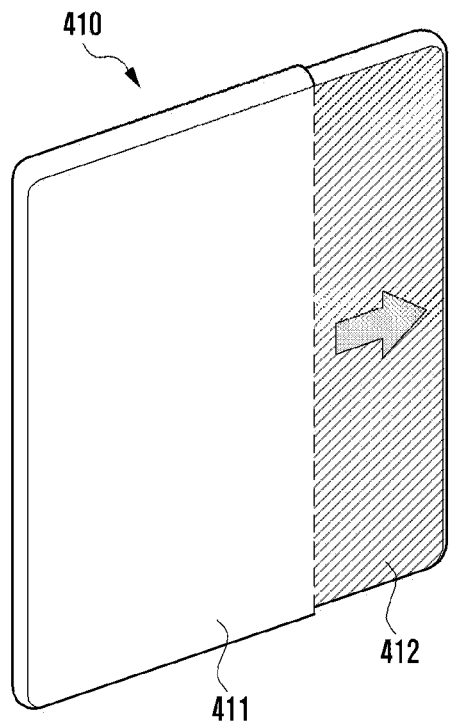
FIGS. 4A, 4B, 4C, 4D, 4E and 4F illustrate a structure of an expandable display of an electronic device according to various example embodiments.
Figure 4A:
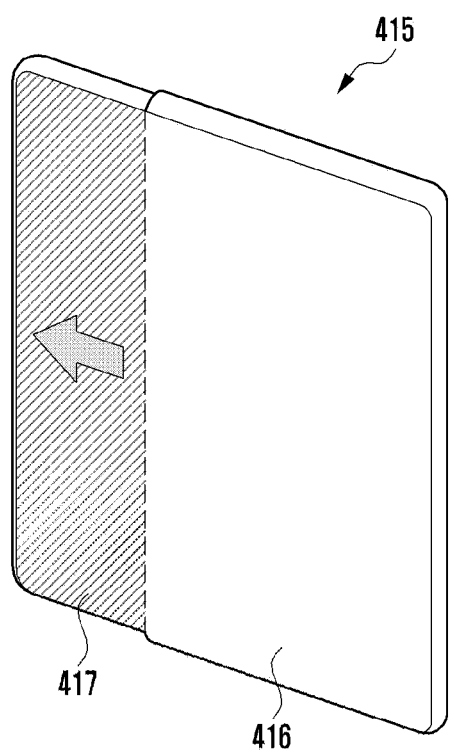

The electronic device shown in FIG. 4A may be implemented to be slidable in one direction. For example, the electronic device may include a display 410 that is expandable in a first direction ① (e.g., the right direction). For example, in a first state (e.g., the closed state) in which the display 410 is not expanded, a screen may be displayed through a first display area 411, and a second display area 412 may be accommodated in the housing and thus be in an inactive state. By a user's manipulation or a preconfigured input, the second display area 412 may be drawn out in the first direction and exposed to the outside. In a second state (e.g., the open state) in which the display 410 is expanded, the state of the second display area 412 may be switched into an active state and a screen may be displayed through the first display area 411 and the second display area 412.

According to another embodiment, the electronic device may include a first display area 416 configured to display a screen in a first state (e.g., the closed state) in which the display 415 is not expanded, and a second display area 417 configured to be expandable in a second direction (②) (e.g., the left direction) and display a screen in a second state (e.g., the open state) in which the display 415 is expanded.

Figure 4B:
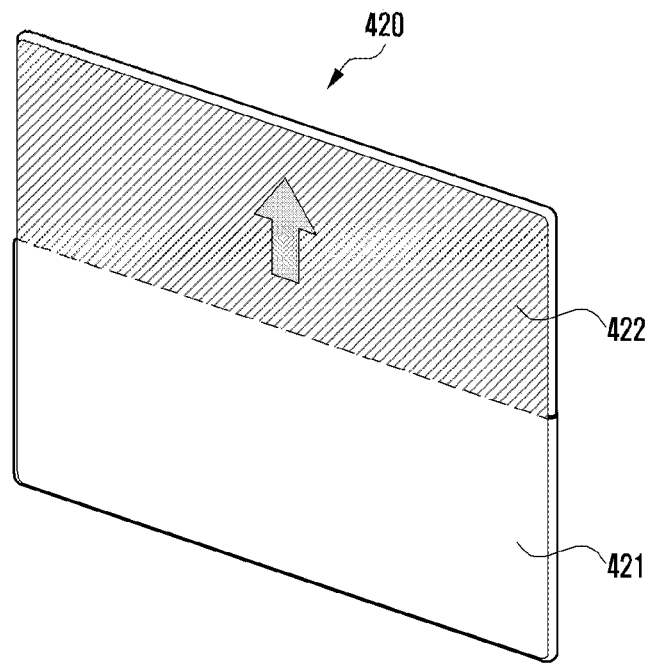
Figure 4B:
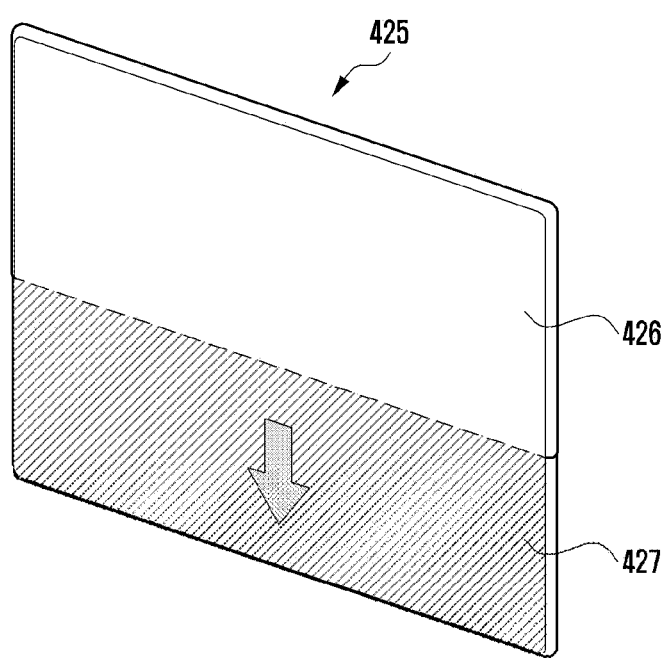

As shown in FIG. 4B, the electronic device may include a display that is expandable in a third direction ③ (e.g., the up direction) or a fourth direction ④ (the down direction). The display 420 may include a first display area 421 configured to display a screen in the unexpanded first state, and a second display area 422 configured to be expandable in the third direction (③) and display a screen in the expanded second state. According to another embodiment, the display 425 of the electronic device may include a first display area 426 configured to display a screen in the unexpanded first state, and a second display area 427 configured to be expandable in the fourth direction ④ and display a screen in the expanded second state.

Figure 4C:
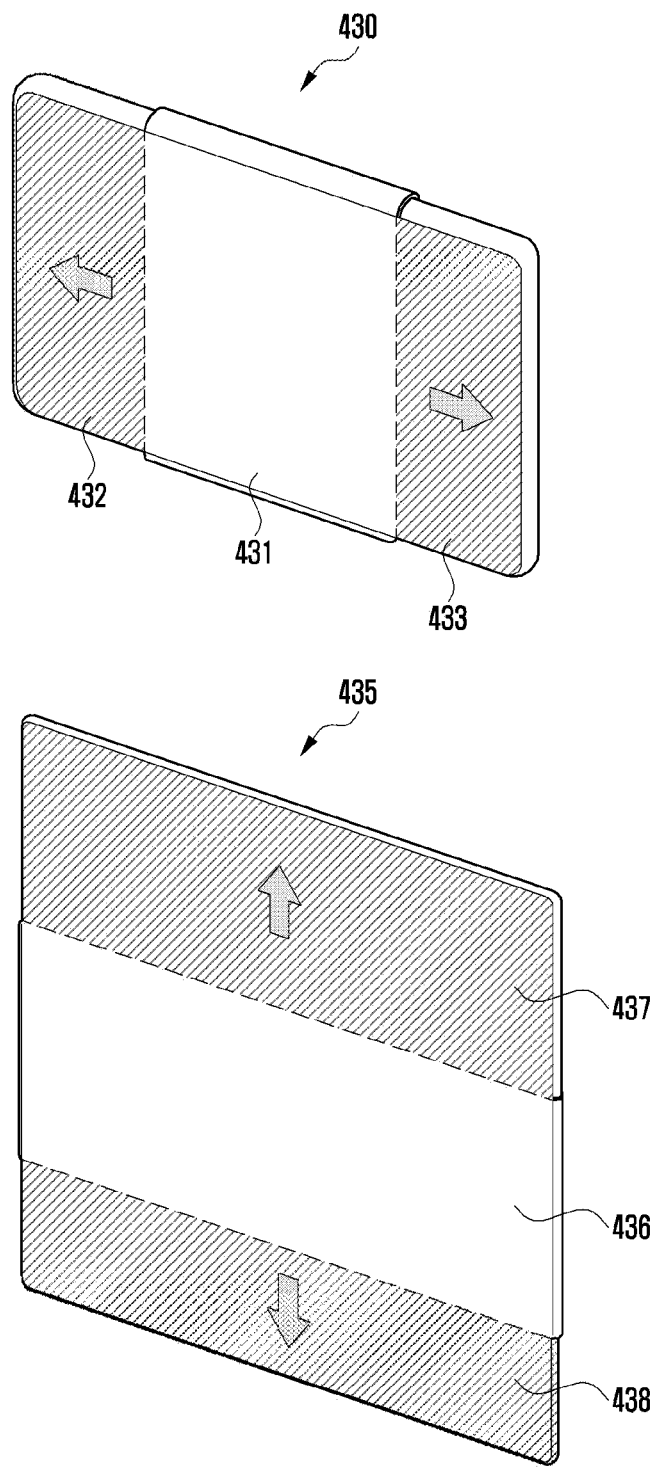

As shown in FIG. 4C, the electronic device may include a display that is expandable in both left and right directions or in both up and down directions. The display 430 may include a first display area 431 configured to display a screen in the unexpanded first state, a second display area 432 configured to be expandable in the first direction (①) and display a screen in the expanded second state, and a third display area 433 configured to be expandable in the second direction (②) and displaying a screen in the expanded second state. In this case, at least one of the second display area 432 and the third display area 433 may be expanded according to a user's manipulation, a preconfigured input, or the type of content to be output.

According to another embodiment, the display 435 of the electronic device may include a first display area 436 configured to display a screen in the unexpanded first state, a second display area 437 configured to be expandable in the third direction (③) and display a screen in the expanded second state, and a third display area 438 configured to be expandable in the fourth direction ④ and display a screen in the expanded second state.

According to various embodiments, an electronic device may include a display that is expandable in both the up direction (or the down direction) and the right direction (or the left direction).

Figure 4D:
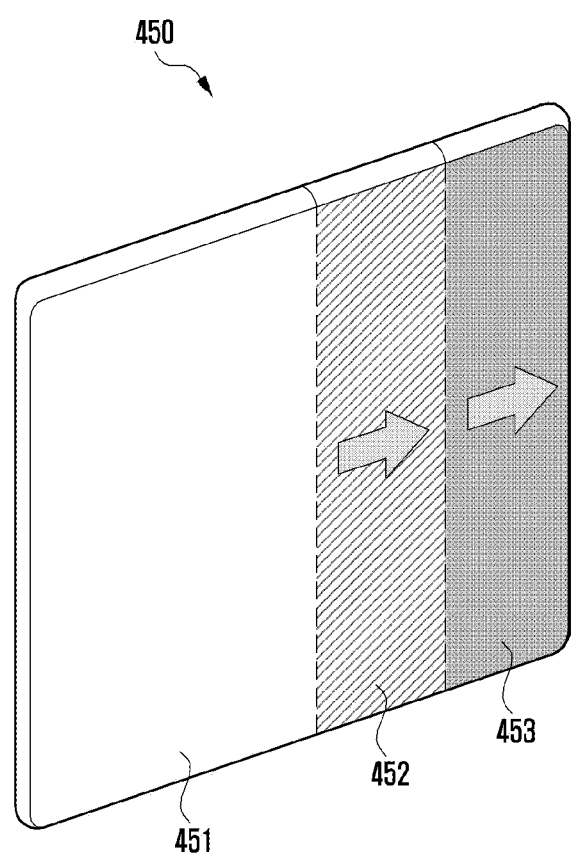

As shown in FIG. 4D, the electronic device may include a display capable of stepwise expansion, and the display may also be partially expanded. The display 450 may include a first display area 451 configured to display a screen in the unexpanded first state, a second display area 452 configured to be expandable in the first direction (①) in the expanded second state and display a screen, and a third display area 453 configured to be additionally expandable in the first direction (①) and display a screen in an additionally expanded third state.

The display 450 may display a screen by activating only the second display area 452. Alternatively, the display 450 may display a screen by activating both the second display area 452 and the third display area 453. For example, when the display 450 is expanded to the second display area 452, the display 450 may be held through a support structure and may be expanded from the second display area 452 to the third display area 453 according to an additional force.

Figure 4E:
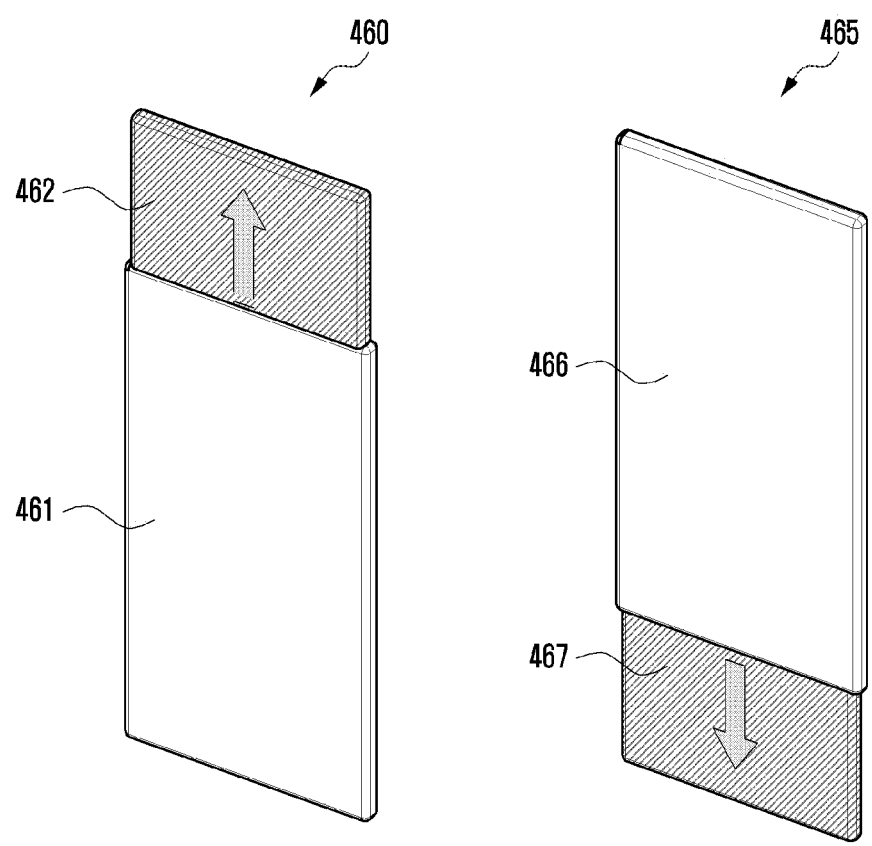

As shown in FIG. 4E, the electronic device may include a display that is expandable in the third direction (e.g., the up direction) or the fourth direction (the down direction). The display 460 may include a first display area 461 configured to display a screen in the unexpanded first state, and a second display area 462 configured to be expandable in the third direction (③) and display a screen in the expanded second state. According to another embodiment, the display 465 of the electronic device may include a first display area 466 configured to display a screen in the unexpanded first state, and a second display area 467 configured to be expandable in the fourth direction ④ and display a screen in the expanded second state.

Figure 4F:
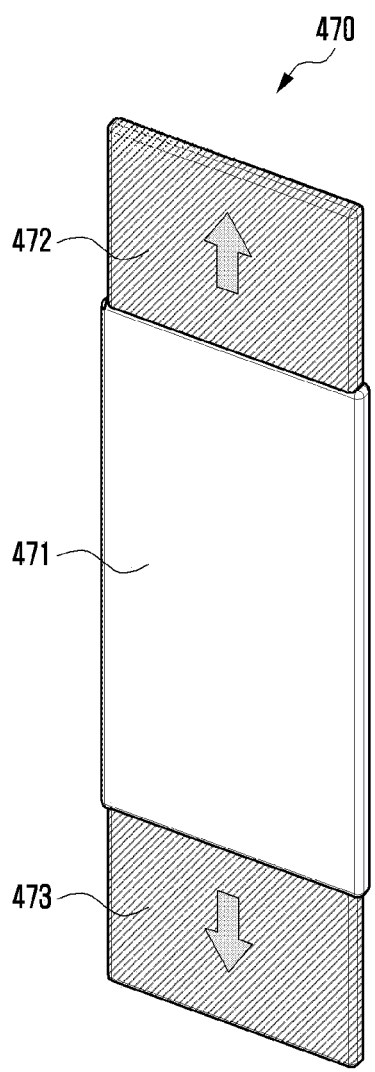

As shown in FIG. 4F, the electronic device may include a display that is expandable in both up and down directions. The display 470 may include a first display area 471 configured to display a screen in the unexpanded first state, a second display area 472 configured to be expandable in the third direction (③) and display a screen in the expanded second state, and a third display area 473 configured to be expandable in the fourth direction ④ and display a screen in the expanded second state. In this case, at least one of the second display area 472 and the third display area 473 may be expanded according to a user's manipulation, a preconfigured input, or the type of content to be output. An electronic device according to various embodiments described below may include a display having at least one structure of FIGS. 4A to 4F and may include various types of expandable displays other than those described in FIGS. 4A to 4F.

Figure 5:
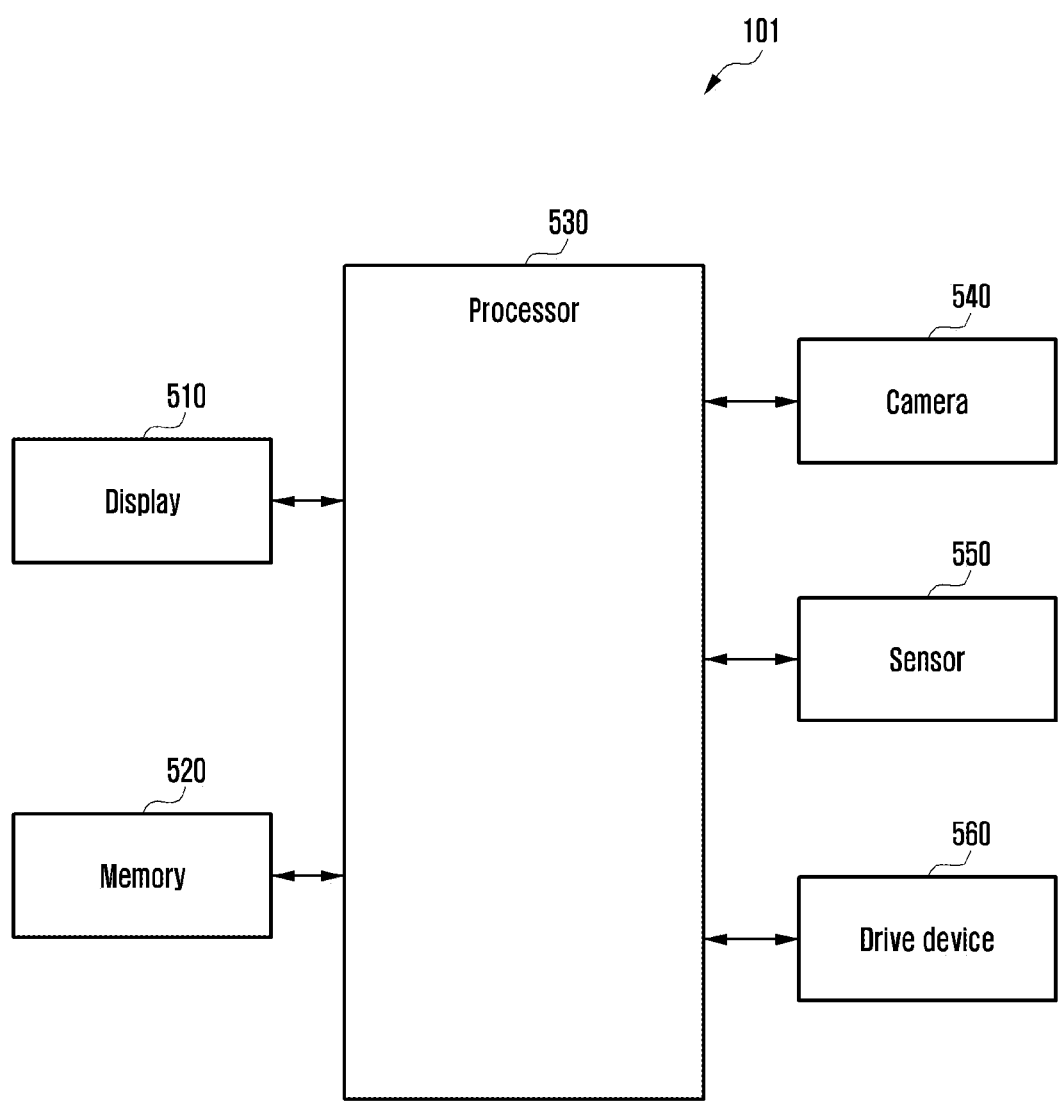
FIG. 5 is a block diagram of an electronic device according to various example embodiments.

FIG. 5 is a block diagram of an electronic device according to various embodiments.

Referring to FIG. 5, an electronic device (e.g., the electronic device 101 in FIG. 1) according to an embodiment may include a display 510 (e.g., the display module 160 in FIG. 1), a processor 530 (e.g., the processor 120 in FIG. 1), a memory 520, a camera 540 (e.g., the camera module 180), a sensor 550 (e.g., the sensor module 176 in FIG. 1), and a drive device 560. The electronic device 101 may further include at least some of the configurations and/or functions of the electronic device 101 of FIG. 1 and may include components overlapping those of FIG. 1.

The electronic device 101 in FIG. 5 may be an electronic device (e.g., FIGS. 2A, 4A to 4D) in which the display 510 is expanded or contracted and a display area for displaying visual information is variable accordingly.

According to an embodiment, the display 510 may include a main area exposed to the outside and at least one expansion area drawn in or drawn out according to the state of the electronic device 101.

According to another embodiment, the display 510 may include a main area exposed to the outside and at least one of a second expansion area and a third expansion area which are drawn into or drawn out according to the state of the electronic device 101.

As described above, based on the state of the electronic device 101, a display area of the display 510 in which visual information (e.g., an execution screen) is to be displayed may be varied. For example, in case of a first state (e.g., the closed state) in which an expansion area is drawn in, the display area may be determined to have a first size, and visual information may be displayed in an area of the first size. For another example, in case of a second state (e.g., the open state) in which the expansion area is drawn out, the display area may be determined to have the entire area (e.g., the main area and the expansion area) of the display 510, and visual information may be displayed in an area of a second size which corresponds to the entire area.

According to an embodiment, the display 510 may have a variable area (or degree of expansion) of the expansion area, which is exposed to the outside of the electronic device 101 according to a user's physical external force or the number of input selections. For example, a user may apply a physical external force to expand the display 510 to a desired area or reduce the display 510 again. For another example, the display 510 may be implemented to have an expansion area which is exposed step by step (e.g., first-step expansion, second-step expansion . . . ) in response to the number of expansion request selections.

A camera 540 may capture an image. The camera 540 may transmit a collected image to the display 510 as a preview image, and image data captured by the camera 540 may be provided to a processor 530.

A sensor 550 may generate data to be used to recognize a state (e.g., the first state, the second state) of the electronic device 101. The sensor 550 may include a sensor (e.g., an encoder or a Hall sensor) attached to a drive device 560 to generate and output data corresponding to the rotation angle of the drive device 550. As another example, the sensor 550 may include a sensor disposed in a designated portion (e.g., a portion of an expansion area) of the display 510 to generate data corresponding to the curvature of a bendable section ② (see FIG. 2B)).

The sensor 550 may determine expansion, reduction, or/and expansion information of the display 510. The sensor 550 may detect a change in area or size of a display area in which visual information is to be displayed, in response to a change in a state of the electronic device 101. The sensor 550 may detect a closed state in which a portion of the display 510 is accommodated inside the electronic device 101, an open state in which the entire display 510 is exposed, or an intermediate state between the closed state and the open state.

The drive device (driver) 550 may be a component configured to perform control such that at least a portion of the display 510 is drawn into or drawn out of the inner space of a housing of the electronic device 101. For example, the drive device 550 may be implemented as a rotation assembly or a sliding motor, but is not limited thereto.

According to some embodiments, the electronic device 101 may control the drive device 550 (e.g., motor) by a physical external force (e.g., a squeeze gesture pressing the electronic device 101). The electronic device 101 may be switched from the closed state to the open state or from the open state to the closed state (e.g., a semi-automatic slide operation) without any further external force due to an elastic structure of the drive device/driver 550.

According to an embodiment, when a signal generated through an input device (e.g., a hardware button or a software button provided through a screen) is generated, the electronic device 101 may be switched from the closed state to the open state, or from the open state to the closed state by the operation of the drive device 550.

A memory 520 may temporarily or permanently store various data related to the electronic device. The memory 520 may store instructions that cause a processor to perform functions of providing a camera preview screen (or camera execution screen) through a portion of the display 410 configured as a display area, based on the expansion of the display area while a camera preview screen is provided through the portion, divide the expanded display area into a first division area and a second division area, and provide the camera preview screen in the first division area and providing an expansion preview screen in the second division area.

A processor 530 may be operatively connected, directly or indirectly, to the display 510, the camera 540, the sensor 550, the drive device/driver 560, and the memory 520.

The processor 530 may determine the state of the electronic device or the expansion state of the display 510, based on the selection of an expansion function item, and the electronic device may expand a display area by the transition from the first state to the second state (e.g., automatic transition or manual transition).

When the camera function is executed, the processor 530 may provide a camera preview screen in a display area of the display 510, based on the selection of an expansion function item and the expansion of the display area to a second size, divide the expanded display area into a first division area and a second division area, and provide the camera preview screen to the first division area and an expansion preview screen through the second division area.

The processor 530 may be configured to perform operations defined by the instructions stored in memory 520. Operations of the processor 530 to be described later may be performed by loading instructions stored in the memory 520.

Operations of the processor 530 will be described in detail below.

Figure 6A:
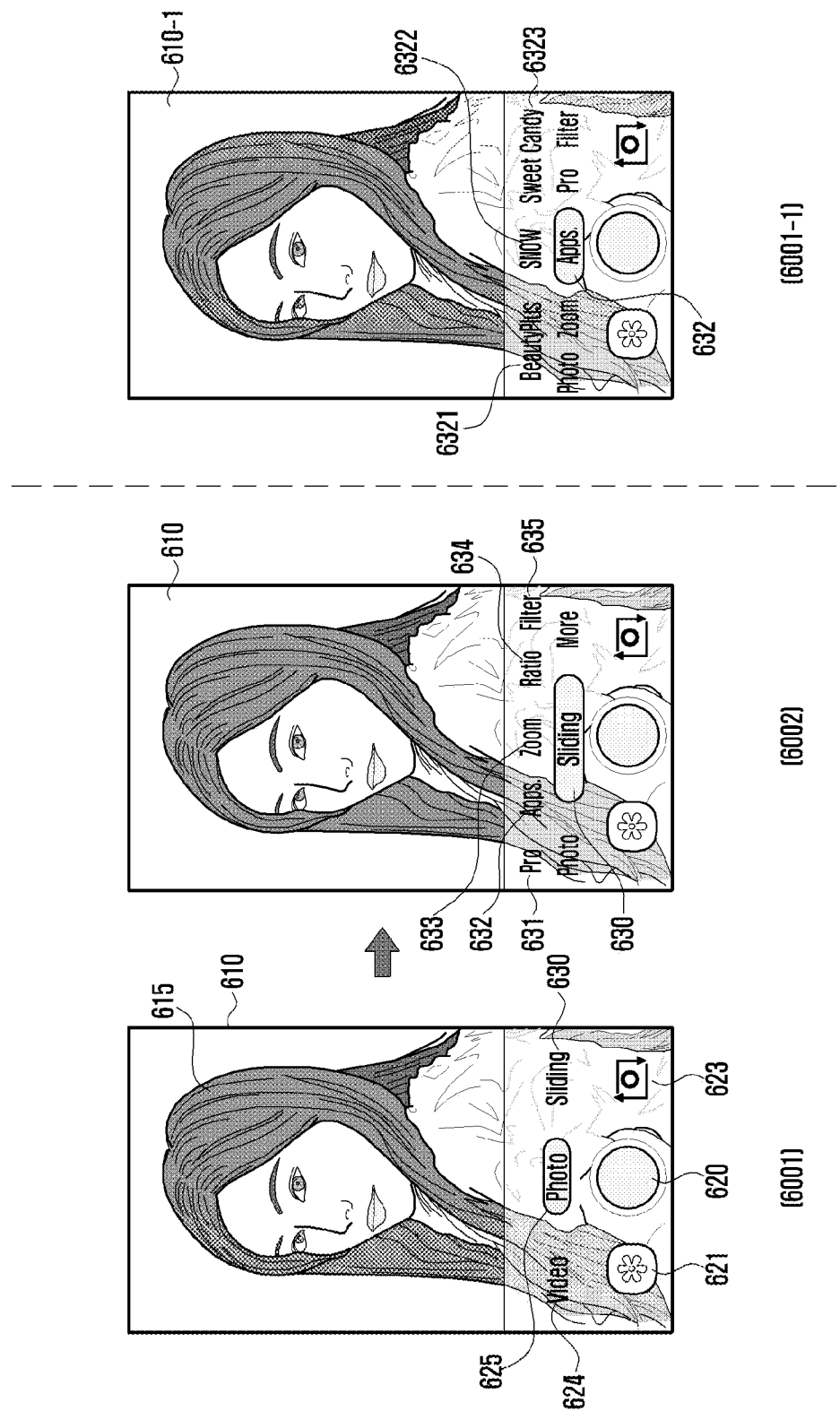
FIGS. 6A and 6B illustrate camera user interface screens according to various example embodiments.
Figure 6B:
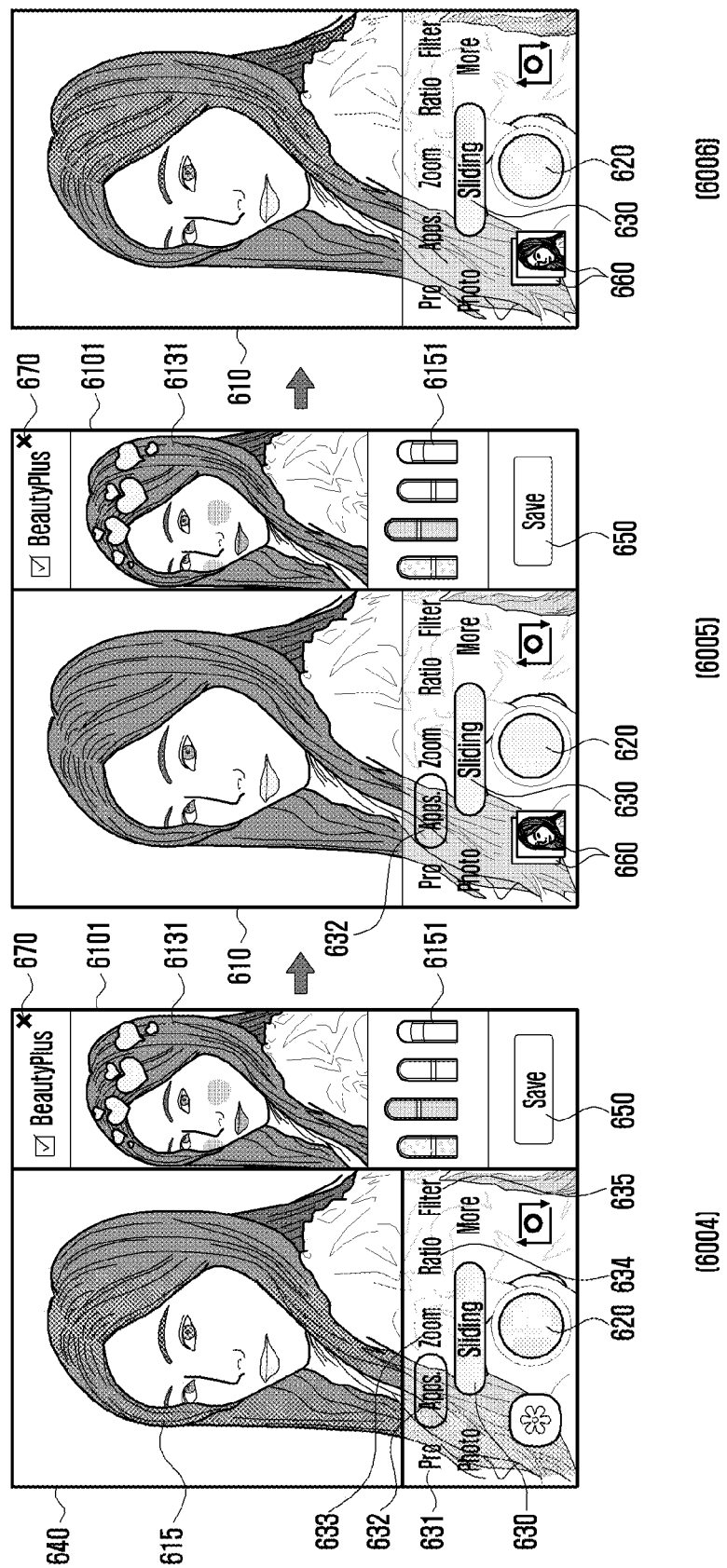

FIGS. 6A and 6B illustrate camera user interface screens according to various embodiments. The electronic devices shown in FIGS. 6A and 6B may be examples of electronic devices enabling single expansion or primary expansion of a display.

Referring to FIGS. 6A and 6B, according to an embodiment, a processor (e.g., the processor 120 in FIG. 1, the processor 530 in FIG. 5) of an electronic device (e.g., the electronic device 101 in FIG. 1) may execute a camera (e.g., the camera module 180 in FIG. 1 or the camera 540 in FIG. 5) to display a camera preview screen 610 shown in 6001 or a camera preview screen 610-1 shown in 6001-1 on a display (e.g., the display module 160 in FIG. 1 or the display 510 in FIG. 5).

For example, when a user touches a camera app icon, the processor 530 may start an execution process of a camera function (e.g., a built-in camera application of an electronic device) in response to the touch. The processor 530 may display an image acquired from an image sensor of the camera on the display as a preview image, based on the execution of the camera.

According to an embodiment, the processor 530 may provide the camera preview screen through the display area of the display, based on the first state (e.g., the closed state) in which the display is not expanded, as shown on the screen indicated by 6001. The camera preview screen 610 may include a preview image 615 acquired from the camera and a camera function user interface. The camera function user interface may be displayed while overlapping the preview image 615.

For example, the camera function user interface may include a shooting button 620, a gallery item 621 enabling entry into a gallery, a camera sensor switching item 623 enabling switching to a front camera or a rear camera, a video shooting items 624 enabling switching to video shooting, a shooting mode switching item 625 capable of changing the angle of view of a camera with respect to a camera preview screen, and an expansion function item 630 (e.g. a sliding item, a zoom item, an app item, a ratio item, a filter item) capable of providing and changing expansion functions in the second state (e.g., the open state) in which the display is expanded, but is not limited thereto.

According to an embodiment, the expansion function item 630 may display text for informing that an expansion function is being performed, while the display is expanded, or guide information may be provided such that the expansion function item 630 is visually differentiated (e.g., add expansion function guide indicator, arrow shape) from a function item that is applied to the camera preview screen (e.g., the built-in camera execution screen).

According to an embodiment, the processor 530 may enter an expansion view user interface (or expansion preview user interface), based on an input (e.g., touch) that selects an expansion function item (e.g., sliding item 630). For example, the expansion view user interface may be switched to screen 6002, and this is for example only and is not limited thereto.

For example, the processor 530 may call an expansion view user interface for calling a preview screen on the camera preview screen 610, based on display expansion, as shown on screen 6002, based on the selectin (e.g., touch) of the sliding 630.

The expansion view user interface of screen 6002 may include various preview function items and may be configured by function items designated during design or function items configured by a user.

For example, the expansion view user interface may include a first view function item (e.g., a pro item 631), a second view function item (e.g., a zoom item 633), a third view function item (e.g., an app item 632), a fourth view function item (e.g., a ratio item 634), and a fifth view function item (e.g., a filter item 635), and is not limited thereto. For example, the pro item 631 may include a function configured by a user in relation to a preview or a function configured to recommend an expansion preview by artificial intelligence. The zoom item 633 may include a function of providing a preview corresponding to screen magnification or a lens type applied to a camera. The app item 632 may include a function of providing a preview related to an external camera application. The ratio item 634 may include a function of providing a preview corresponding to an aspect ratio. The filter item 635 may include a function of providing a preview to which a filter is to be applied.

According to an embodiment, the electronic device 101 may support expansion function items to be added, deleted, and stored through a user configuring menu.

According to another embodiment, the processor 530 may provide the camera preview screen 610-1 shown in 6001-1 in response to camera execution.

The camera preview screen 610-1 shown in 6001-1 may include a camera function and an expansion view user interface. For example, the camera preview screen 610-1 may display camera function items (e.g., a video item, a photo item) and expansion function items (e.g., a zoom item, an app item, a pro item, a filter item) as higher layer items.

Additionally, the zoom item, app item, pro item, and filter item related to the expansion function may further display sub-items on the camera preview screen 610-1 as lower layer items. The expansion function item (e.g., the zoom item, the app item, the pro item, the filter item) may display text for informing that an expansion function is being performed, while the display is expanded, or guide information may be provided such that the expansion function item is visually differentiated (e.g., add expansion function guide indicator, arrow shape) from the camera function item (e.g., the function applied to the built-in camera).

For example, sub-items of the app item 632 may be provided on the camera preview screen 610-1, based on the app item 632 selected by a user, among the expansion function items. The sub-items of the app item 632 may include an app1 item (e.g., the beauty plus item 6321), an app2 item (e.g., the snow item 6322), and an app 3 item (e.g., sweet candy item 6322) corresponding to external camera applications, but are only examples for explanation and are not limited thereto.

Sub-items related to the pro item 631 may include a first configuration item, a second configuration item, or a recommendation item, but are not limited thereto. Sub-items related to the zoom item 633 may include an ultra-wide-angle lens, a normal lens, a telephoto 1 lens (10×) or a telephoto 2 (100×) item, or a 1×, 5×, 10×, or 100× magnification item, but are not limited thereto. Sub-items related to the ratio item 634 may include 16:9 or 9:16, 1:1, 4:3, 21:9, or 9:21, but are not limited thereto. Sub-items related to the filter item 635 may include a first filter, a second filter, a third filter, or a fourth filter, but are not limited thereto. The electronic device 101 may support each sub-item to be addable or deletable by user configurations.

As shown on screen 6004, the processor 530 may expand the display area and divide the expansion display area into a first division area and a second division area in response to the detection of an input for selecting one of the expansion function items (631, 632, 633, 634, 635) on screen 6002 or one of the sub-items (e.g., 6321, 6322, 6323) on screen 6001-1 and the transition of the display from the first state (e.g., the closed state) to the second state (e.g., the open state). The processor 530 may provide the camera preview screen 610 through the first division area and provide an expansion preview screen 6101 corresponding to the selected expansion preview function through the second division area.

According to an embodiment, when an expansion function item on screen 6002 is selected, the expansion preview screen 6101 may be a screen executed by selecting one of a plurality of preview functions, based on information on frequently used preview functions, recently used preview functions, or preview functions configured by a user, which are related to the selected expansion function. For example, when a user selects the zoom item 633 on screen 6002, the processor 530 may identify a 5× view function designated as the highest priority and provide an expansion preview screen corresponding to the 5× view function to the second division area. After that, when the user reselects the zoom item 633 or drags the second window in one direction, the processor 530 may identify a lower priority view function (e.g., a 100× view item) related to the zoom item 633, and switch the expansion preview screen to a lower priority view function screen and provide the same.

According to another embodiment, when an expansion function item of the sub-items on screen 6001-1 is selected, the expansion preview screen 6101 may be a screen executed on which a function corresponding to the selected sub-item is executed.

A user interface provided on screen 6002 will be given in the following description. For example, as shown in 6004, the processor 530 may provide the camera preview screen 610 through the first division area and provide an expansion preview screen 6101 (e.g., a beauty plus camera app execution screen) corresponding to the app item 632 to the second division area, based on the selection of an expansion function item (e.g., the app 632) of an external camera application and the transition of the electronic device 101 to the second state (e.g., the open state). The camera preview screen 610 provided in the first division area may be maintained as a screen identical to the screen 6002.

The expansion preview screen 6101 may include a view image 6131 obtained by applying the selected expansion function to a preview image (e.g., the same subject as that in the camera preview screen) obtained from the camera, function items 6151 related to the expansion preview, a separate save item 650, and a cancel item 670. According to some embodiments, cancel item 670 may be omitted.

According to some embodiments, when a user additionally selects the app item 632, the processor may execute another expansion function (e.g., another external camera app (e.g., snow app)) related to the selected expansion function (e.g., the beauty plus camera app) and perform transition such that an execution screen (e.g., a snow app execution screen) of another expansion function is in the second division area to.

According to another embodiment, when a drag input in one direction is applied onto the expansion preview screen 6101 by a user, the processor may transition a screen of the preview expansion function (e.g., the beauty plus camera app execution) displayed in the second division to an execution screen (e.g., the snow app execution screen) of another expansion function.

According to another embodiment, when the user selects an expansion preview item (e.g., the zoom item) on the camera preview screen 610, the expansion preview screen 6101 may be switched to an execution screen related to the zoom item.

The processor 530 may simultaneously store the camera preview screen 610 and the expansion preview screen 6101 as separate images, based on the selection of the shooting button 620 on screen 6005, and store the same as first and second images 660, respectively. The processor 530 may provide separately stored images 660 to at least a portion of the camera preview screen 610, based on the simultaneous storage.

For another example, the electronic device 101 may store only the expansion preview screen 6101 (e.g., the second image), based on the selection of the separate save item 650 on the expansion preview screen 6101.

The processor 530 may terminate the expansion function, based on the transition of the electronic device 101 from the second state (e.g., the open state) to the first state (e.g., the closed state). The processor 530 may return to the camera preview screen 610 as shown on screen 6006.

According to an embodiment, when the display is transitioned to the first state (e.g., the closed state) by a user's external force while the expansion function is activated (on), the processor 530 may end the expansion function and return to the camera preview screen 610 as shown on screen 6006. According to an embodiment, when the user deselects the app item 632 (e.g., a long press input), the processor 530 may transition the electronic device 101 from the second state to the first state, terminate the expansion function, and return to the camera preview screen 610 as shown on screen 6006.

According to some embodiments, the processor 530 may end the expansion function and return to the camera preview screen 610 as shown on screen 6006, based on the selection of the cancel item 670 on the expansion preview screen 6101.

According to an embodiment, when the display is in an expanded second state (e.g., the open state), the processor 530 may provide an expanded camera preview screen through the expanded display area in response to a camera app execution request. In this case, when an expansion function item is selected in the second state in which the display is expanded, the processor 530 may be transitioned without state transition of the electronic device to divide a display area into a first division area and a second division area such that the camera preview screen 610 is provided through the first division area and the expansion preview screen 6101 is provided through the second division area.

Hereinafter, the configurations described in FIGS. 6A and 6B may be equally applied to the following drawings.

Figure 7A:
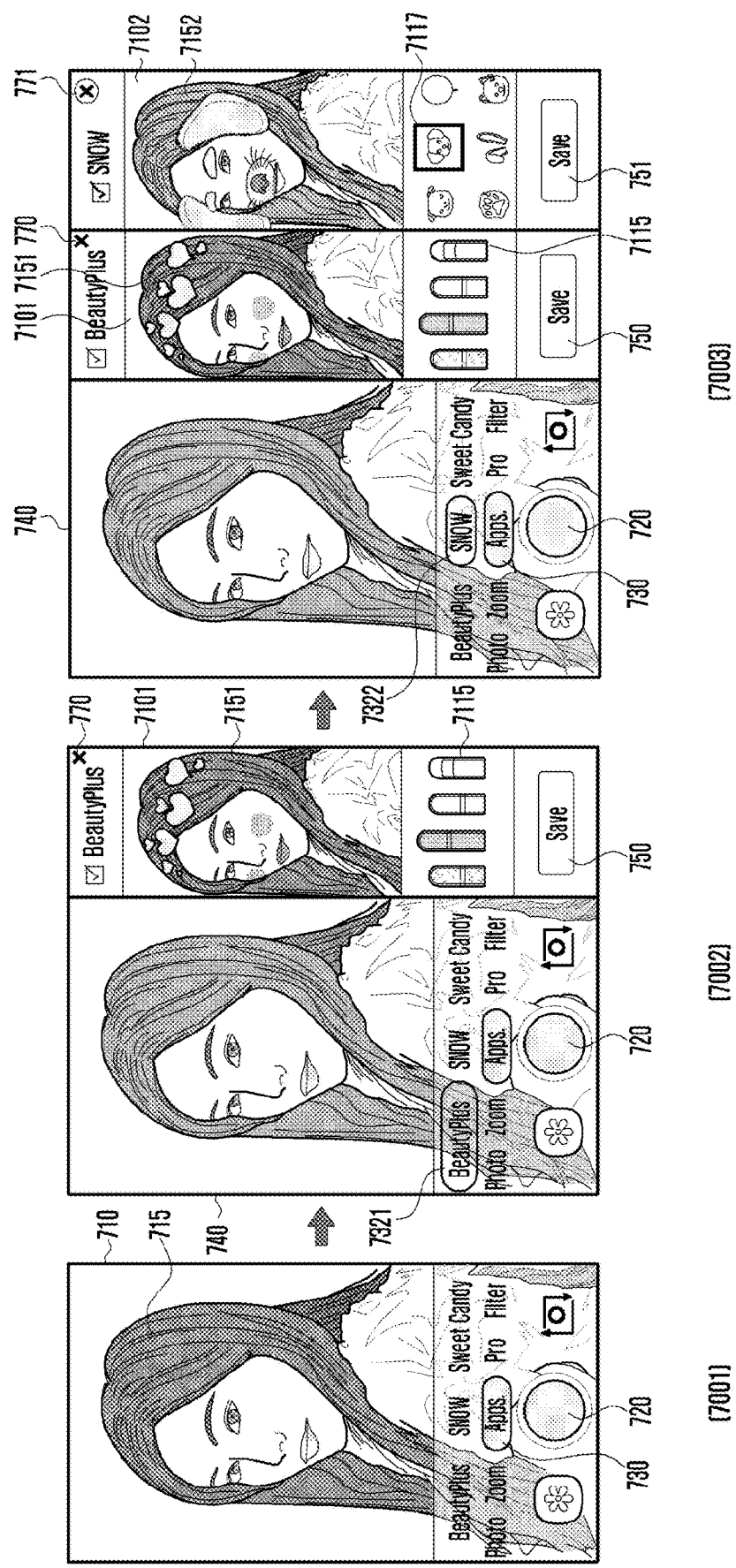
FIGS. 7A, 7B, and 7C illustrate camera user interface screens according to various example embodiments.
Figure 7B:
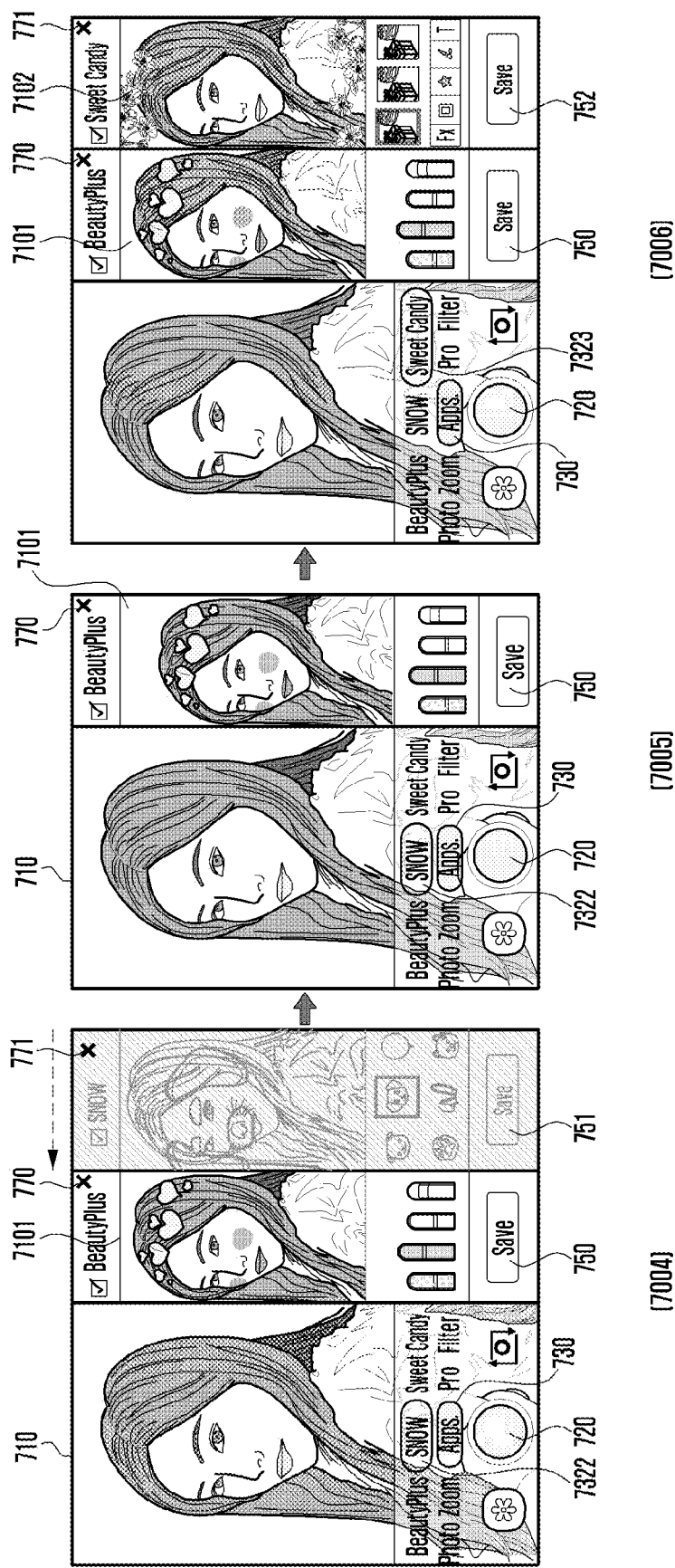
Figure 7C:
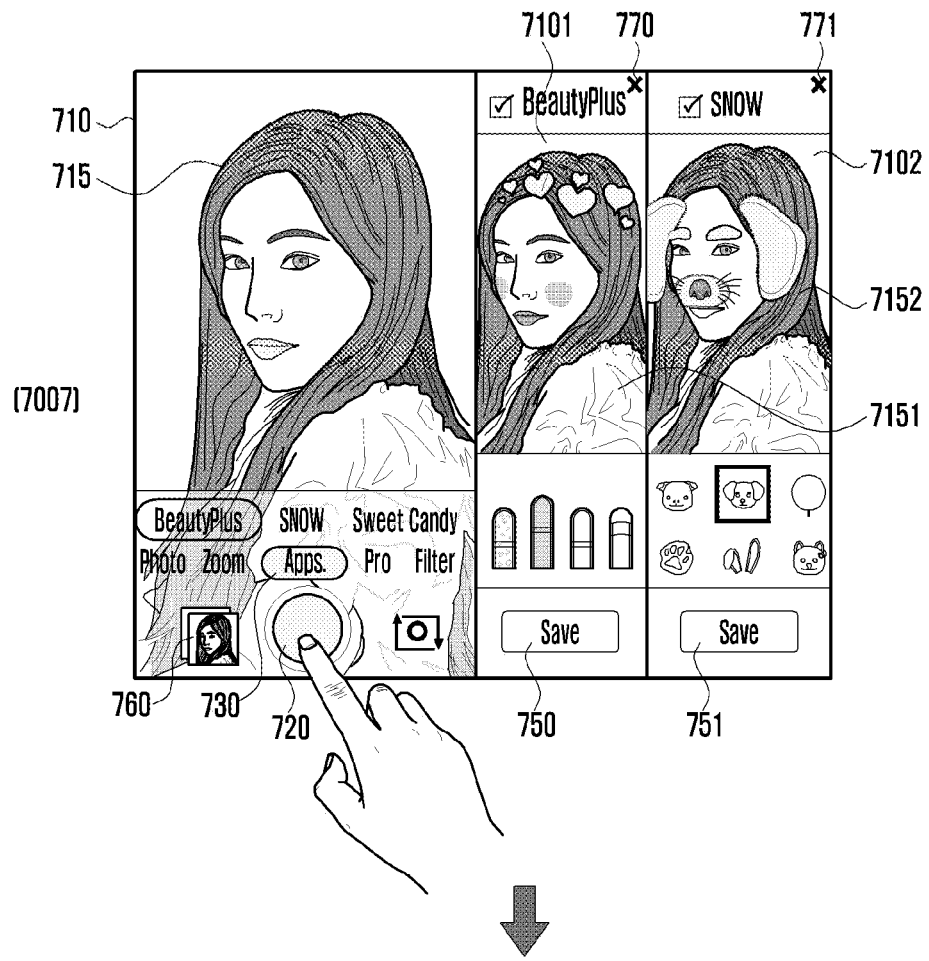
Figure 7C:
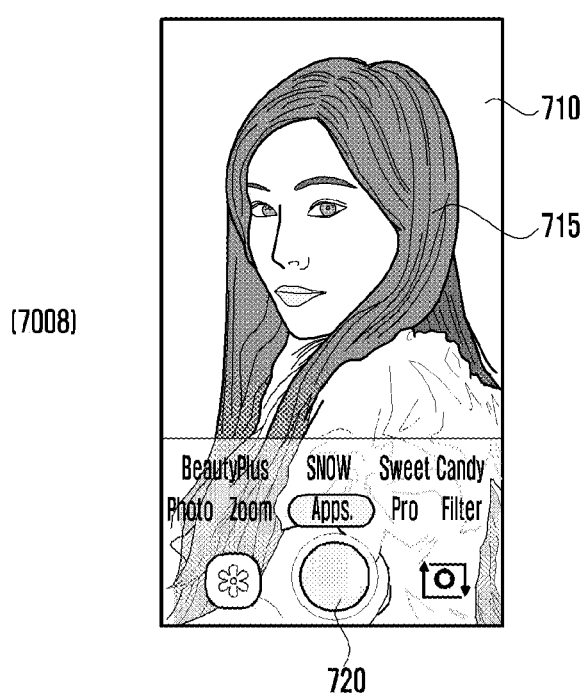

FIGS. 7A to 7C illustrate camera user interface screens according to various embodiments. The electronic devices illustrated in FIGS. 7A to 7C may be examples of electronic devices enabling multi-expansion or stepwise expansion of a display. In the description of FIG. 7, parts overlapping with the descriptions of FIGS. 6A and 6B are omitted or briefly described.

Referring to FIGS. 7A to 7C, according to an embodiment, as shown in 7001, in a first state in which the display (e.g., the display module 160 in FIG. 1 or the display 510 in FIG. 5) is not expanded, a processor (e.g., the processor 120 in FIG. 1 or the processor 530 in FIG. 5) of an electronic device (e.g., the electronic device 101 in FIG. 1) may display a camera preview screen 710 on a display.

The processor 530 may provide an expansion view user interface on the camera preview screen 710 (e.g., including a preview image 715 obtained from the camera), based on a user input. The expansion view user interface may be displayed while overlapping the preview image 715. Since the expansion view user interface shown in FIGS. 7A to 7C is the same as the user interface shown in 6001-1, detailed description thereof will be omitted.

The processor 530 may provide sub-items (e.g., the beauty plus item 6321, the snow item 6322, and the sweet candy item 6323 in FIG. 6A) of an app item 730, based on, for example, the selection of the app item 730.

According to an embodiment, as shown in 7002, the processor 530 may transition the electronic device 102 from the first state to the second state to expand a display area by a first step, based on the selection of the first sub-item, for example, the beauty plus item 7321. Alternatively, the electronic device 101 may be transitioned from the first state to the second state by a user's external force in a state where the beauty plus item 7321 is selected, thereby expanding the display area by a first step.

In response to the transition to the second state (e.g., the open state), the processor 530 may divide the expanded display area into a first division area and a second division area to provide a camera preview screen 710 in the first division area and a first expansion preview screen 7101 to the second division area as a view image related to the selected beauty plus item 7321. For example, the first expansion preview screen 7101 may be an execution screen of a beauty plus camera app. The first expansion preview screen 7101 may include a view image 7151 obtained by applying the corresponding app configuration to a preview image (e.g., the same subject as that in the camera preview screen) acquired from the camera, a view function item 7115, a separate save item 750, and a cancel item 770. According to some embodiments, the cancellation item 770 may be omitted.

As shown in 7003, the processor 530 may transition the electronic device from the second state to the third state, based on the selection of a second sub-item, for example, a snow item 7322, to further expand the display area by a second step. Alternatively, the electronic device 101 may be transitioned from the second state to the third state by a user's external force.

The processor 530 may divide the further expanded display area into a first division area, a second division area, and a third division area in response to the transition to the third state, and may provide a camera preview screen 710 to the first division area, a first expansion preview screen 7101 corresponding to the selected first sub-item mode to the second division area, and a second expansion preview screen 7102 corresponding to the selected second sub-item to the third division area.

The second expansion preview screen 7102 may include a view image 7151 obtained by applying the corresponding app configuration to a preview image (e.g., the same subject as that in the camera preview screen) acquired from the camera, a view function item 7117, a separate save item 751, and a cancel item 771.

The processor 530 may end the expansion function (or an expansion view display mode), based on an expansion view cancel input (e.g., sub-item deselection or cancel item selection) or physical state reduction.

According to an embodiment, when a user selects a cancel item (e.g., 771) included in the second expansion preview screen on screen 7004, the processor 530 may perform transition from the third state to the second state and may end the display in the third division area, based on the transition to the second state, and return to screen 7005. For another example, in case of the transition to the second state in screen 7004 by a user's external force, the processor 530 may end the second expansion function and return to screen 7005.

According to an embodiment, when a user selects a cancel item (e.g., 770) on the first expansion preview screen on screen 7004, the processor 530 may transition the electronic device to the second state and transition the first expansion preview screen in the second division area to the second expansion preview screen.

As shown on screen 7006, the process 530 may transition the electronic device from the second state to the third state, based on an input for selecting a third sub-item (e.g., the sweet candy item 7323), and based on the transition to the third state, the processor 530 may provide a camera preview screen 710 through the first division area, a first expansion preview screen 7101 through the second division area, and a second expansion preview screen 7102 as a view image related to the sweet candy item 7323 through the third division area.

According to some embodiments, the processor 530 may support an expansion preview screen to be transitioned to another sub-view screen. For example, when a drag input in one direction is detected on the second expansion preview screen 7102, the second expansion preview screen 7102 may be transitioned to a screen related to another sub-item (or a sub-item of the next priority).

According to an embodiment, based on the selection of a shooting item 720 in 7003, the processor 530 may perform transition to screen 7007 to simultaneously store the camera preview screen 710, the first expansion preview screen 7101, and the second expansion preview screen 7102 as separate images, and may store the same as a first image, a second image, and a third image, respectively. The processor 530 may provide the separately stored images 760 to at least a portion of the camera preview screen 710, based on the simultaneous storage. For another example, the electronic device 101 may also select the separate save item 750 on the first expansion preview screen 7101 to store only the first expansion preview screen 7101 (e.g., the second image) or select the separate save item 751 on the second expansion preview screen 7102 to store only the second expansion preview screen 7102 (e.g., the third image).

Based on the transition of the electronic device 1010 to the first state, the processor 530 may end the expansion preview function and return to the camera preview screen 710 as shown in 7008.

Although not shown in the drawings, the processor 530 may respond in real time according to the transition from the first state to the second state, the transition from the first state to the third state, the transition from the second state to the third state, the transition from the third state to the first state, the transition from the third state to the second state, and the transition from the second state to the first state, by a user's external force, to adaptively change and provide display of the camera preview screen 710, the first expansion preview screen 7101, and the second expansion preview screen 7102.

Figure 8:
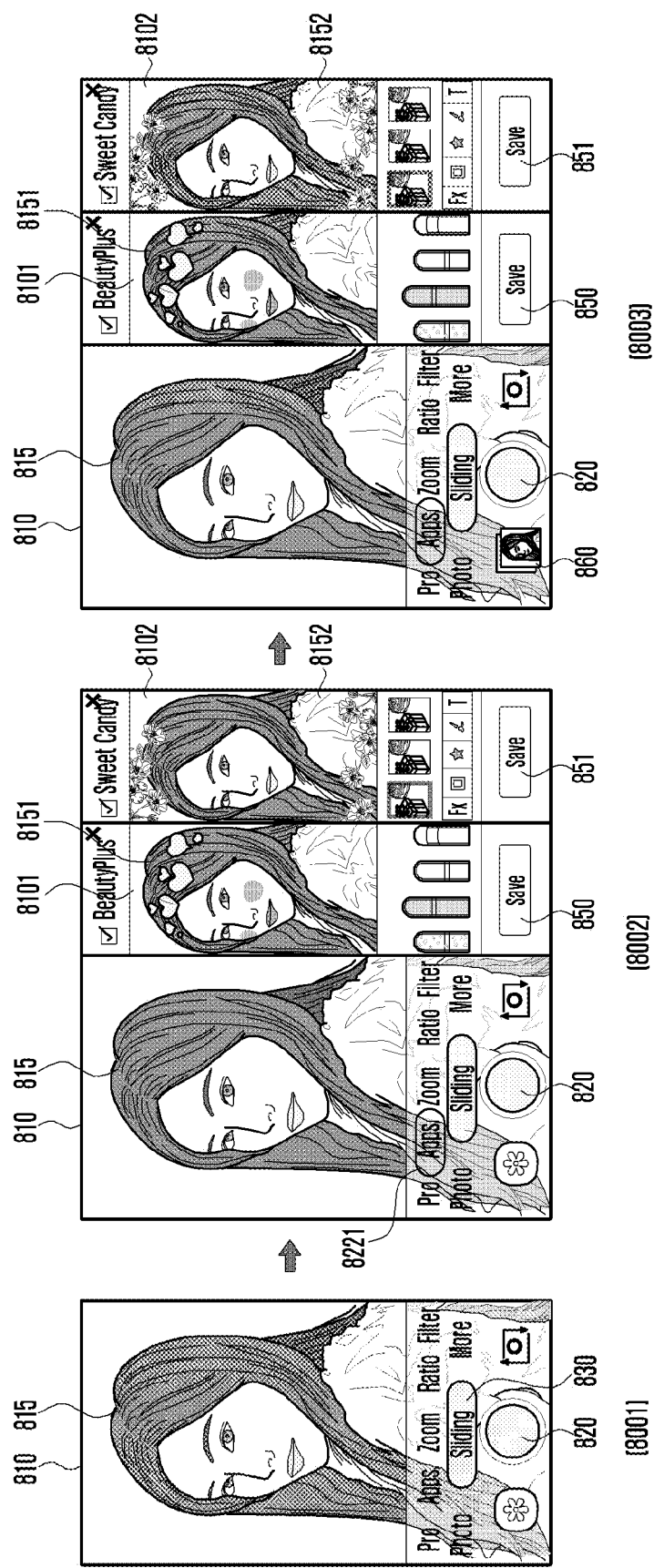
FIG. 8 illustrates expansion view user interface screens according to various example embodiments.

FIG. 8 illustrates expansion view user interface screens according to various embodiments.

Referring to FIG. 8, the processor, an electronic device (e.g., the electronic device 101 in FIG. 1), when executing an expansion function, may support automatically providing an expansion preview screen corresponding to an expansion function configured as the highest priority.

According to an embodiment, a processor (e.g., the processor 120 in FIG. 1 or the processor 530 in FIG. 5), when executing an expansion function, may provide an expansion preview screen, in response to the transition of the electronic device from the first state to the second state, based on information on frequently used preview functions or recently used preview functions, which are related to the expansion function.

As shown in 8001, in a first state in which a display (e.g., the display module 160 in FIG. 1 or the display 510 in FIG.

5) is not expanded, the processor 530 may display a camera preview screen 810 including a preview image 815 in a display area. Since the user interface on the camera preview screen 810 is the same as that on screen 6002, detailed descriptions thereof will be omitted.

Based on the selection of an expansion function item (e.g., a sliding item 830), the processor 530 may provide an expansion view user interface (e.g., a pro item, an app item, a zoom item, a ratio item, a filter item) to a display, and the electronic device may be transitioned from the first state to the third state. As shown in 8002, in response to the transition to the third state, the processor 530 may provide a camera preview screen 810 to the first division area, provide, to the second partition area, a first expansion preview screen 8101 including an image 8101 to which a preview function designated as the highest priority is applied, and provide, to the third division area, a second expansion preview screen 8102 including an image 8152 to which a preview function designated as a lower priority is applied.

Based on the selection of the shooting item 820, as shown in 8003, the processor 530 may simultaneously store the camera preview screen 810, the first expansion preview screen 8101, and the second expansion preview screen 8102, or based on the selection of separate save items 850 and 851, may separately store the screens. The processor 530 may provide the separately stored images 860 to at least a portion of the camera preview screen 710, based on the simultaneous storage.

According to an embodiment, the electronic device 101 may support enabling the priority configuration for expansion functions, such as a first priority, a second priority, or a third priority, according to user configurations. When an expansion function is selected, the electronic device 101 may provide an expansion preview screen according to a preconfigured priority or recommended priority, without entering a separate sub-item.

Figure 9:
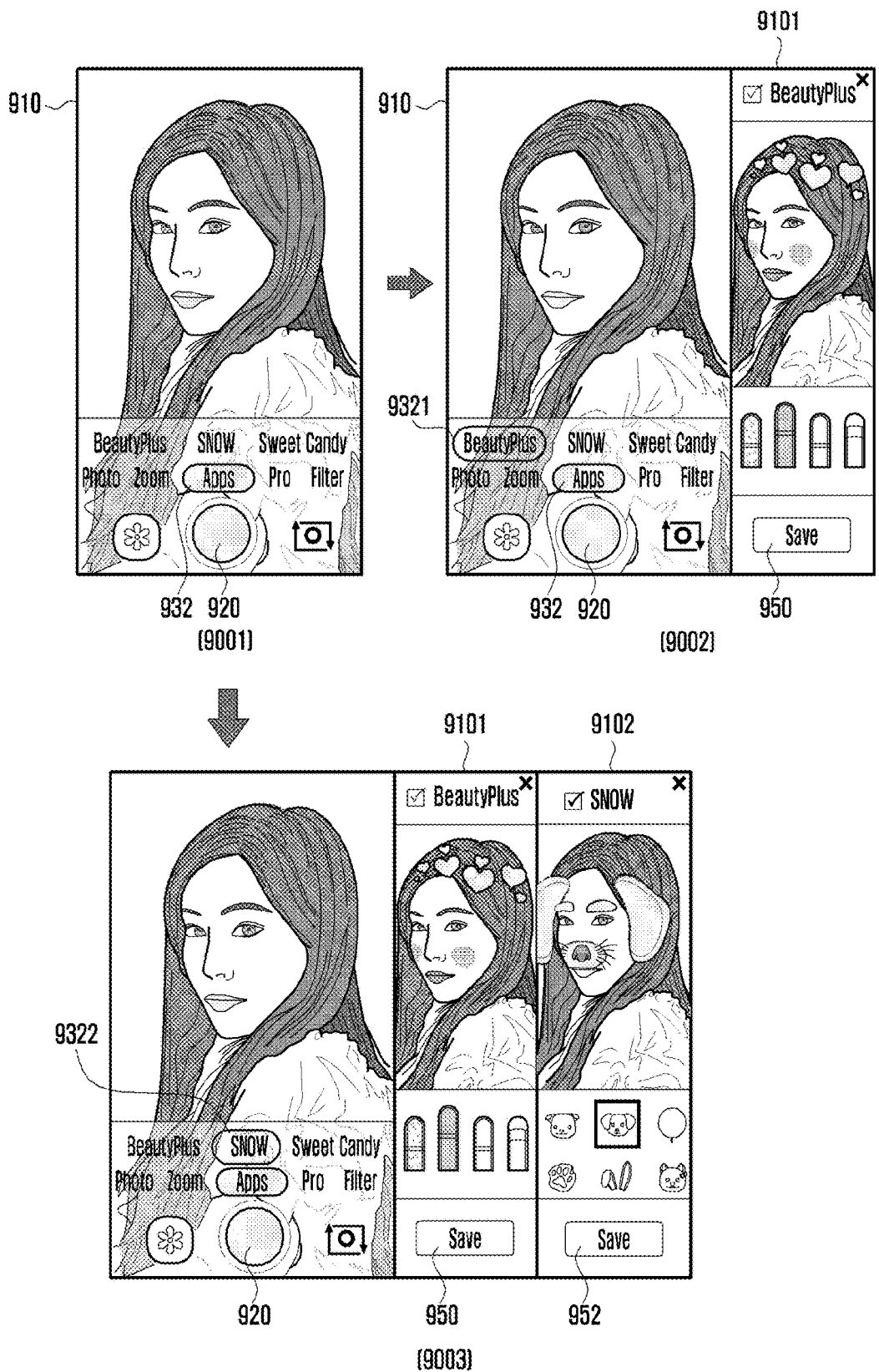
FIG. 9 illustrates expansion view user interface screens according to various example embodiments.

FIG. 9 illustrates expansion view user interface screens according to various embodiments.

Referring to FIG. 9, according to an embodiment, an electronic device (e.g., the electronic device 101 in FIG. 1), when executing an expansion function, may support automatic transition of a display (e.g., the display module 160 in FIG. 1, the display 510 in FIG. 5) or manual transition of the display by a user's physical external force.

As shown in 9001, in a first state in which the display 510 is not expanded, a processor (e.g., the processor 120 in FIG. 1 or the processor 530 in FIG. 5) may display a camera preview screen 910 in a display area.

According to an embodiment, when an expansion function is executed on screen 9001, the processor 530 may provide an expansion view user interface to the display 510 and automatically transition the electronic device 101 from the first state to the second state, as shown in 9002.

In response to the selection of an app item 932 and the automatic transition to the second state, the processor 530 may divide the expansion display area into a first division area and a second division area and may provide a first expansion preview screen 9101 as a preview image related to the beauty plus item 9321 designated as the highest priority in relation to the app item 932 to the second division area.

For another example, the processor 530 may automatically perform transition from the first state to the second state, based on the selection of the app item 932 and the selection of the beauty plus item 9321.

According to another embodiment, the processor 530 may detect that screen 9001 is manually transitioned from the first state to the third state by an external force or an additional input of the input device.

The processor 530 may identify a display area expanded by the transition of the electronic device to the third state, divide the expanded display area into a first division area, a second division area, and a third division area in response thereto, and provide a camera preview screen 910 to the first division area, provide a first expansion preview screen 9101 corresponding to the first expansion function to the second division area, and provide a second preview screen 9102 corresponding to the second expansion function to the third division area.

Here, as shown in 9003, when the display is expanded by a physical external force, the processor 530 may execute a preconfigured expansion function or an expansion function designated by a priority order, to provide a first expansion preview screen 9101 and/or a second expansion preview screen 9102. For example, the first expansion preview screen 9101 may include a preview image related to the beauty plus item 9321 designated as the highest priority in relation to the app item 932, and the second expansion preview screen 9102 may include a preview image related to the snow item 9322 designated as a second priority in relation to the app item 932.

A user may transition the electronic device 101 to the second state or to the first state by a physical external force. In this case, the processor 530 may detect a change in the display area in response to the manual transition by the user in real time and may terminate the expansion view function or provide the first expansion preview screen 9101 or simultaneously provide the first expansion preview screen 9101 and the second expansion preview screen 9102.

Figure 10A:
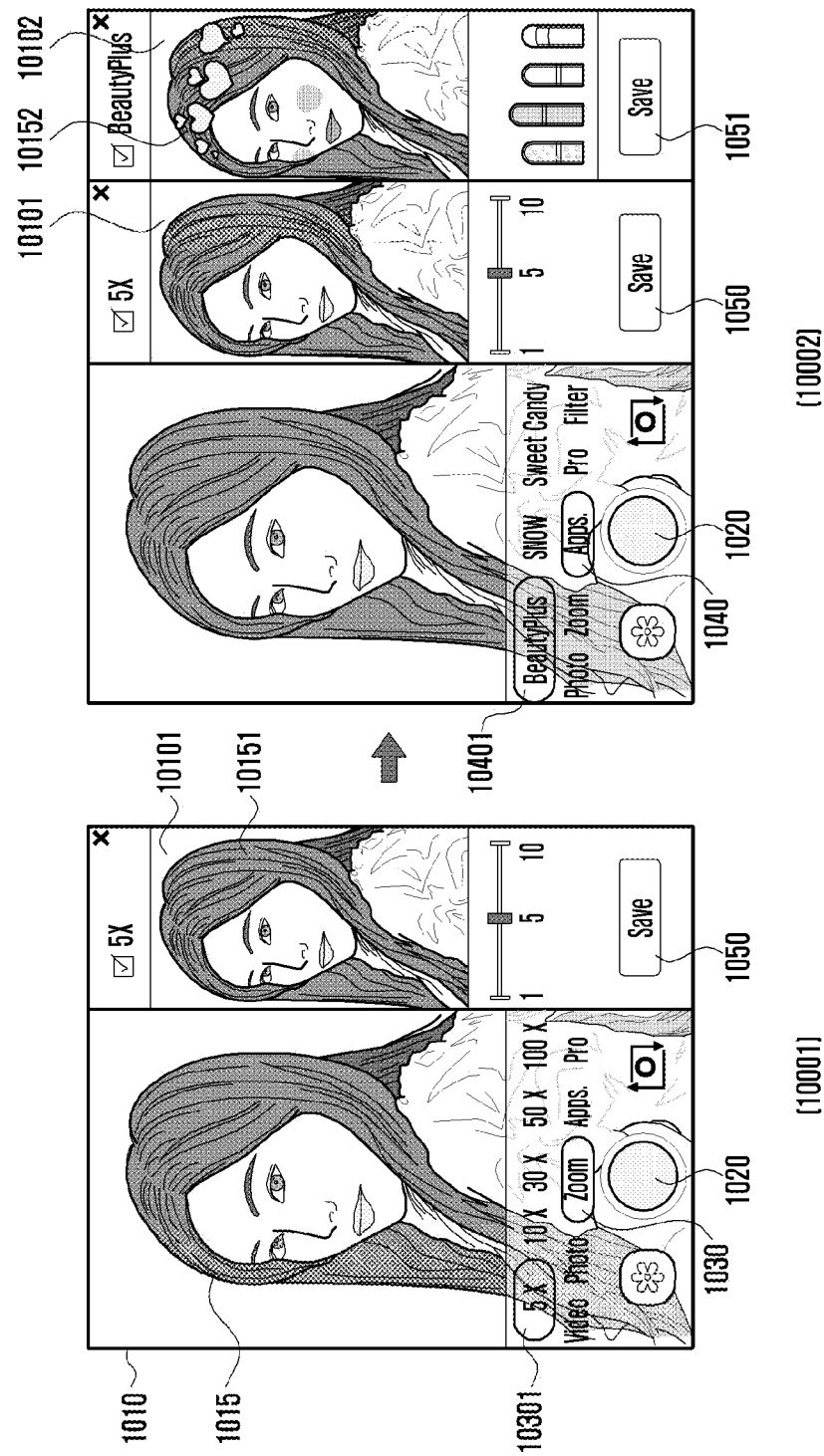
FIGS. 10A and 10B illustrate expansion view user interface screens according to various example embodiments.
Figure 10B:
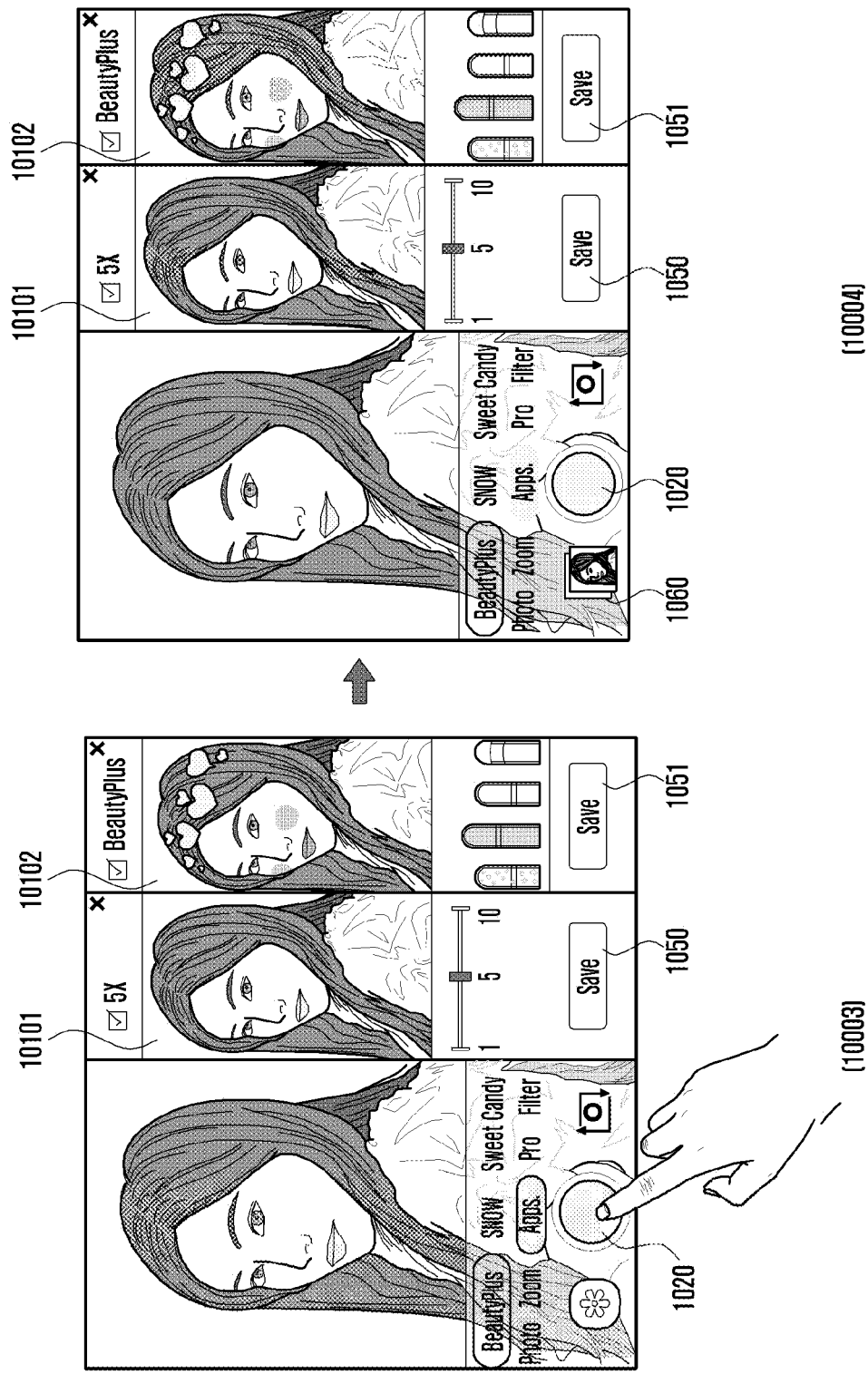

FIGS. 10A and 10B illustrate expansion view user interface screens according to various embodiments.

Referring to FIGS. 10A and 10B, according to an embodiment, an electronic device (e.g., the electronic device 101 in FIG. 1) may simultaneously support expansion functions for different sub-items in an expanded function mode.

As shown in 10001, in a second state in which a display is expanded, a processor (e.g., the processor 120 in FIG. 1 or the processor 530 in FIG. 5) may provide a camera preview screen 1010 via a first division area and provide a first expansion preview screen 10101 via a second division area.

For example, a user may select a zoom item 1030 to call sub-items (e.g., 5×, 10×, 30×, 50×, 100×) for the zoom mode onto the screen, and select a 5× item 10301 among from the sub-items. Based on the selection of the 5× item 10301, the processor 530 may display, in the second division area, a first expansion preview screen 10101 including an image 10151 obtained by magnifying a preview image 1015 five times.

In a state where the image 10151 magnified 5 times is displayed via the second division area, as shown in 10002, a user may select an app item 1040 to call sub-items (e.g., a beauty plus item, a snow item, a sweet candy item) for an app function onto the screen, and may select the beauty plus item 10401 among from the sub-items.

The processor 530 may provide a second expansion preview screen 10102 through the third division area in response to the selection of the beauty plus item 10401 and the transition of the electronic device 101 from the second state to the third state. The second expanded preview screen 10102 may include a beauty plus camera preview image

10152, which is an expansion function different from the expansion function provided in the second division area.

As shown in 10003, based on the selection of a shooting item 1020, the processor 530 may simultaneously store the camera preview screen 1010, the first expansion preview 10101 including the image 10151 magnified 5 times in the preview state, and the second expansion preview screen 10102 including the beauty plus camera preview image 10152 as separate images. As shown in 10004, the processor 530 may simultaneously store images 1060 on at least a portion of the camera preview screen 1010 or provide separately stored images 1060, based on the simultaneous storage.

According to another embodiment, based on the selection of a separate save item 1050 on the first expansion preview screen 10101, the processor 530 may store only the first expansion preview screen (e.g., a second image) or store only the second expansion preview screen (e.g., the second image) by selecting the separate save item 1051 on the expansion preview screen 10102.

Figure 11:
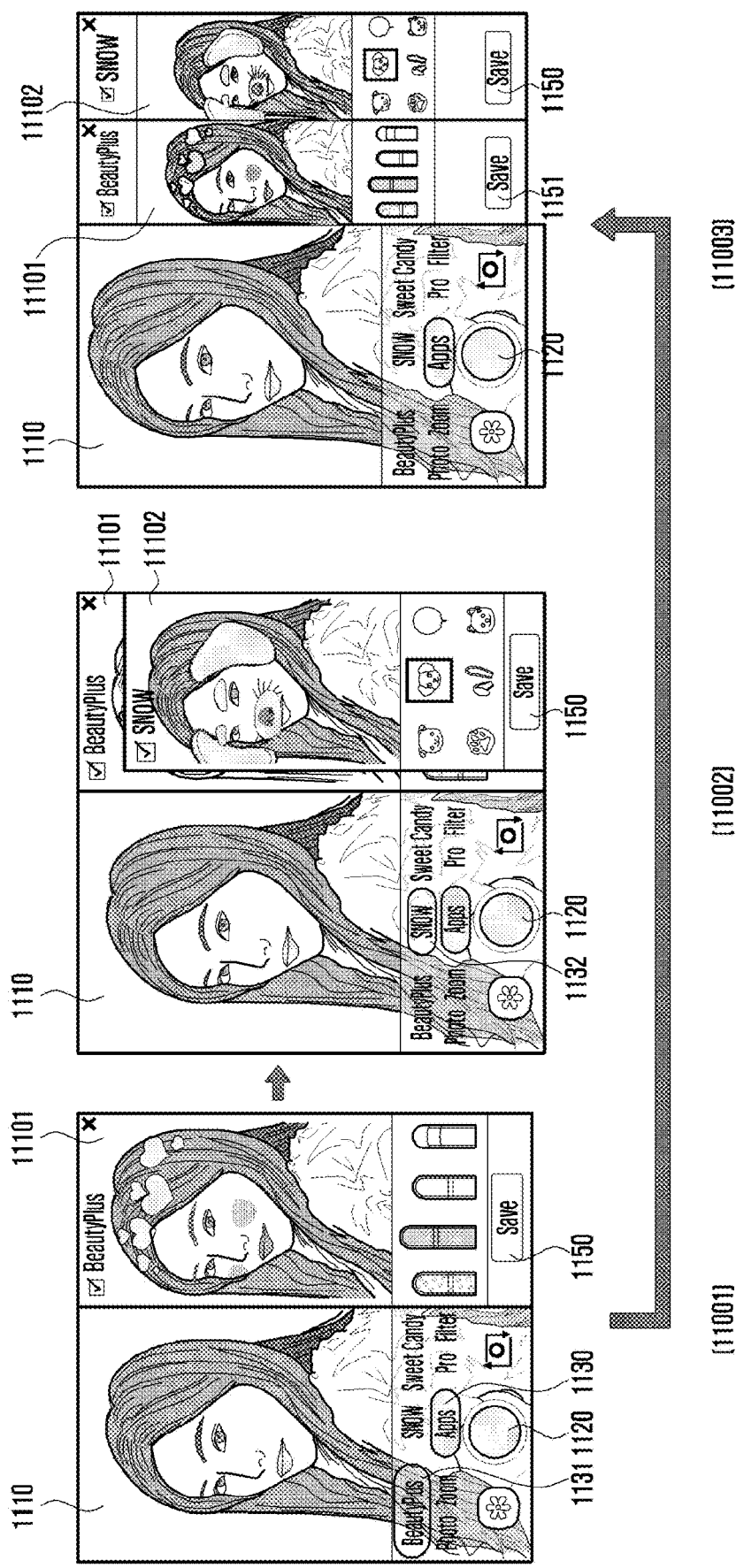
FIG. 11 illustrates expansion view user interface screens according to various example embodiments.

FIG. 11 illustrates expansion view user interface screens according to various embodiments.

Referring to FIG. 11, an electronic device (e.g., the electronic device 101 in FIG. 1) according to an embodiment may support providing an expansion preview screen in a pop-up form or by re-dividing the second division area when an additional expansion function is selected.

According to an embodiment, as shown in 11001, in a second state in which a display is expanded, a processor (e.g., the processor 120 in FIG. 1 or FIG. 5) may provide a camera preview screen 1110 to a first division area and provide a first expansion preview screen 11101 via a second division area.

According to an embodiment, based on the selection of another expansion preview item (e.g., a snow item), the processor 530 may provide a second expansion preview screen 11102 corresponding to another selected expansion view item in the form of a pop-up window on the first expansion preview screen 11101, as shown in 11002. The second expansion preview screen 11102 may be provided in a relatively smaller size than the first expansion preview screen 11101.

According to another embodiment, based on the selection of another expansion view item (e.g., the snow item), as shown in 11003, the processor 530 may re-divide the second division area to provide a first expansion preview screen 11101 in a 1/2 area of the second division area and a second expansion preview screen 11102 in a 2/2 area of the second division area.

The processor 530 may simultaneously store or separately store the camera preview screen 1110, the first expansion preview screen 11101, and the second expansion preview screen 11102 through the shooting button 1120 or the separate save items 1150, 1151 on screen 11002 or 11003.

Figure 12:
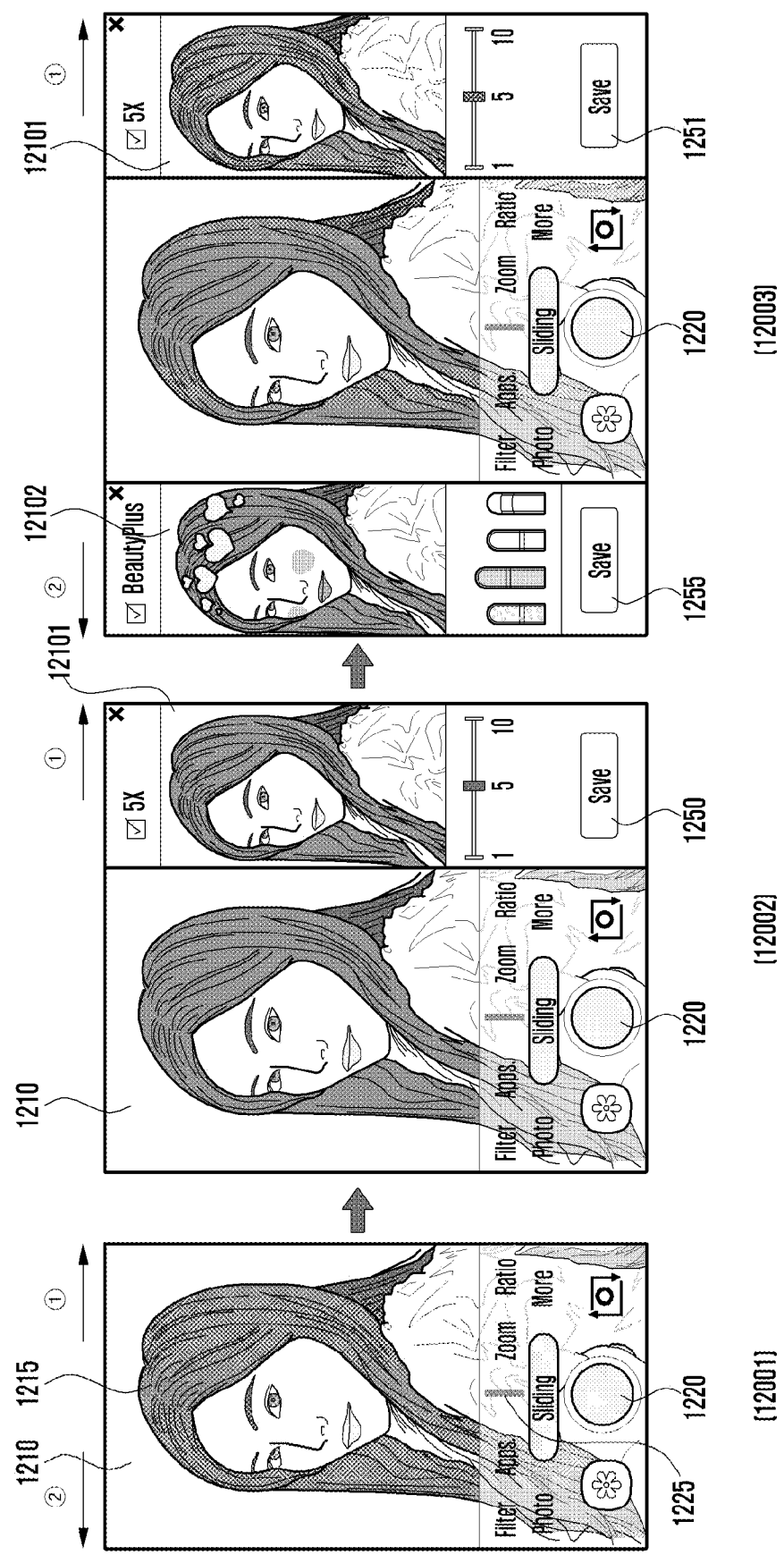
FIG. 12 illustrates expansion view user interface screens according to various example embodiments.

FIG. 12 illustrates expansion view user interface screens according to various embodiments.

Referring to FIG. 12, according to an embodiment, in a first state in which a display (e.g., the display module 160 in FIG. 1 or the display 510 in FIG. 5) is not expanded, a processor (e.g., the processor 120 in FIG. 1 or the processor 530 in FIG. 5) of an electronic device (e.g., the electronic device 101 in FIG. 1) may display a camera preview screen 1210 in a display area.

The processor 530 may provide an expansion view user interface to the camera preview screen 1210 (e.g., including a preview image 1215 obtained from the camera), based on a user input.

According to an embodiment, in the case of an electronic device including a display which expands in both directions, expansion view user interface may further provide a direction distinguishing indicator 1225, as shown in 12001.

On screen 12001, based on the direction distinguishing indicator 1225, the expansion view user interface may include expansion preview items (e.g., a zoom items, a ratio item) positioned in a first direction and expansion preview items (e.g., a filter item, an app item) positioned in a second direction, and a first expansion preview screen 12101 may be provided in an area expanding in the first direction, and a second expansion preview screen 12102 may be provided in an area expanding in the second direction.

In response to the selection of the zoom item and the expansion of the electronic device 101 in the first direction to be transitioned from the first state to the second state, the processor 530 may provide the first expansion preview screen 12101 through the area expanding in the first direction as shown on screen 12002. In this case, the transition to the second state may be achieved by a user, and the transition from the first state to the second state may also be automatically achieved by the selection of the zoom item.

In response to the selection of the app item and the expansion of the electronic device 101 in the second direction to be transitioned from the second state to the third state, the processor 530 may provide the second expansion preview screen 12102 through the area expanding in the second direction as shown on screen 12003. In this case, the transition to the third state may be achieved by a user, and the transition from the second state to the third state may also be automatically achieved by the selection of the app item.

On screen 12003, the processor 530 may simultaneously or separately store the camera preview screen 1210, the first expansion preview screen 12101, and the second expansion preview screen 12102 through the shooting button 1220 or separate save items 1250, 1251.

Figure 13:
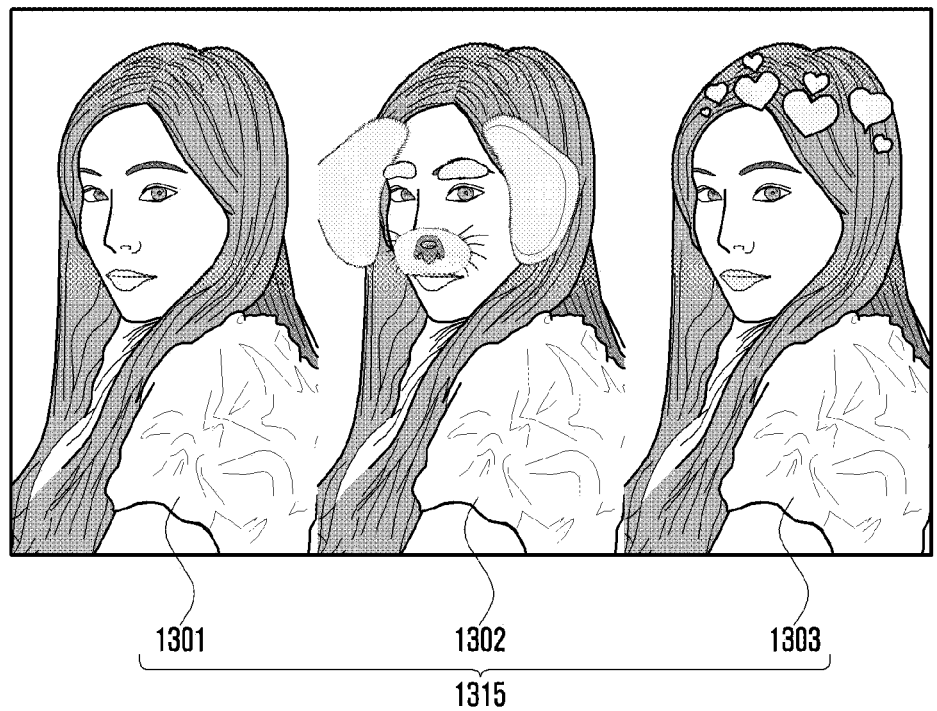
FIG. 13 illustrates a merged image related to an expansion function according to various example embodiments.
Figure 13:
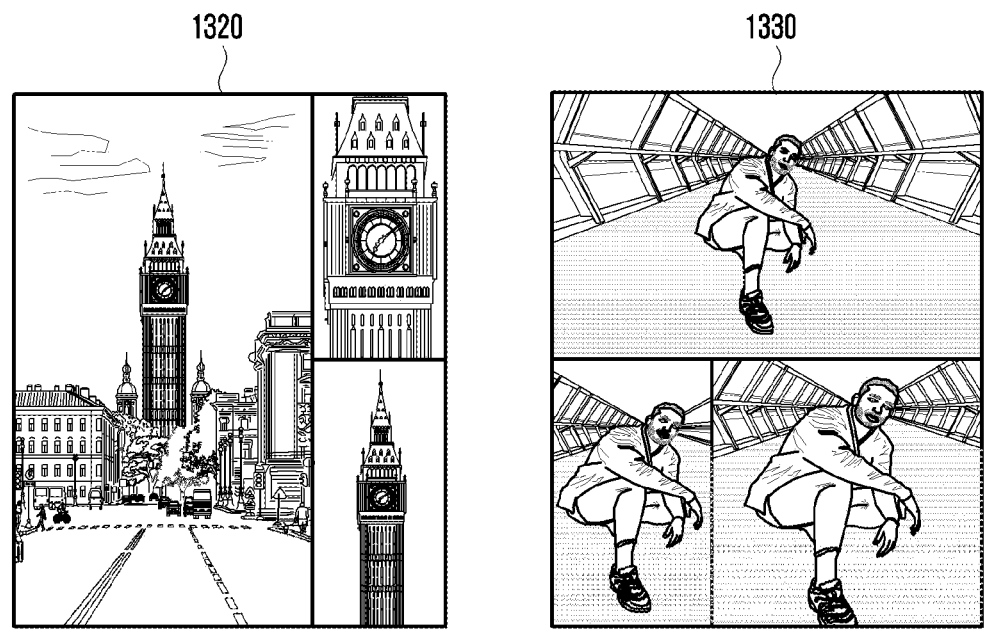

FIG. 13 illustrates a merged image related to an expansion function according to various embodiments.

Referring to FIG. 13, an electronic device (e.g., the electronic device 101 in FIG. 1) according to an embodiment may support a function of merging images separately stored when simultaneously capturing the images by using a plurality of preview functions in relation to an expansion function into a single image.

For example, as in the drawings described above, the electronic device 101 may separately store a camera execution screen 1301, a first expansion preview screen 1302, and a second expansion preview screen 1032, and then merging the images according to a user request to generate a merged image 1315. For another example, the electronic device 101 may also add various expansion functions to generate an image 1320 obtained by simultaneously storing and merging preview images displayed by a first zoom preview function, a second zoom function, and a third zoom function in relation to the preview image acquired from the camera; or an image 1330 obtained by simultaneously storing and merging preview images having a first aspect ratio, a second aspect ratio, and a second aspect ratio.

Figure 14A:
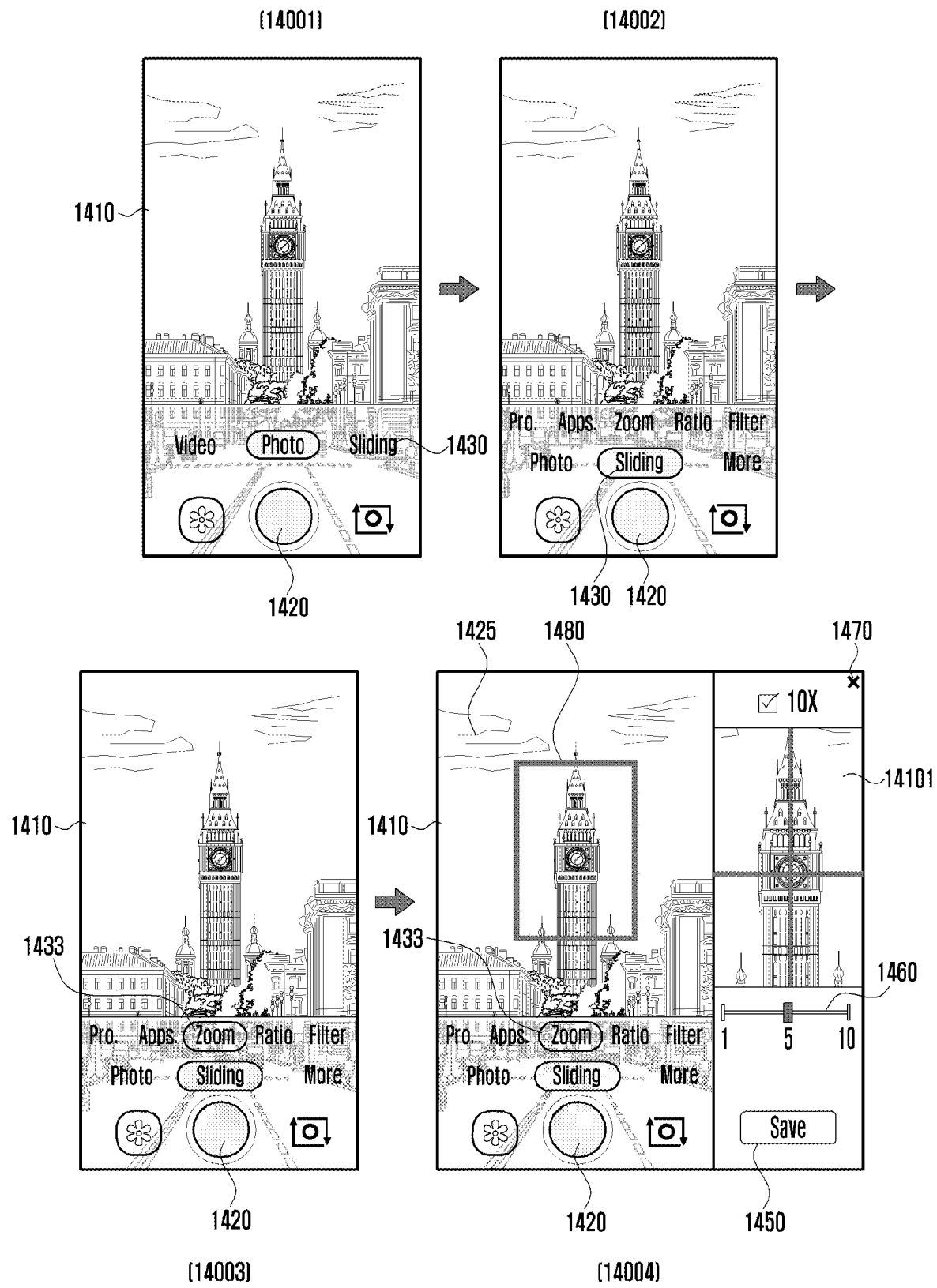
FIGS. 14A and 14B illustrate expansion view user interface screens according to various example embodiments.
Figure 14B:
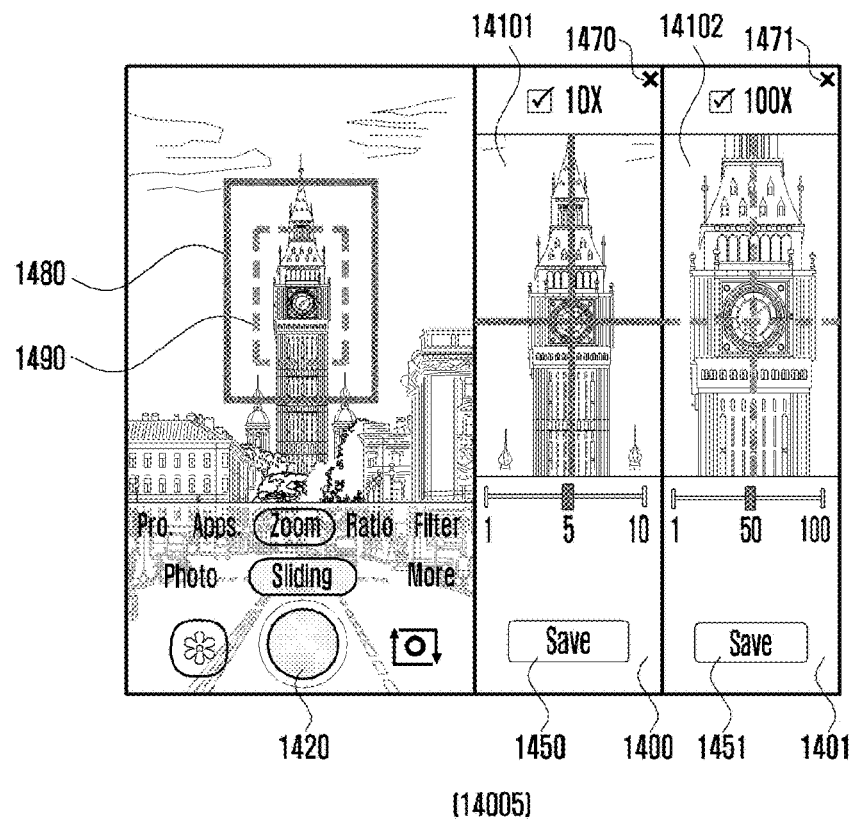
Figure 14B:
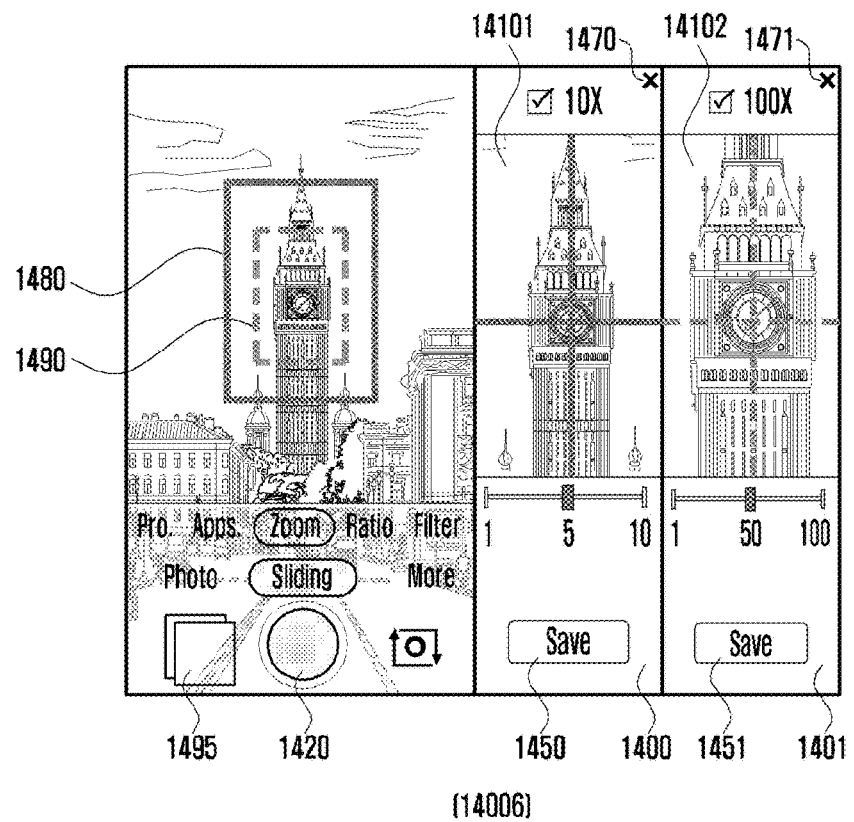

FIGS. 14A and 14B illustrates expansion view user interface screens according to various embodiments.

Referring to FIGS. 14A and 14B, according to an embodiment, an electronic device (e.g., the electronic device 101 in FIG. 1) may support various zoom ratios by an expansion function.

According to an embodiment, as shown in 14001, in a first state in which a display (e.g., the display module 160 in FIG.

1 or the display 510 in FIG. 5) is not expanded, a processor (e.g., the processor 120 in FIG. 1, the processor 530 in FIG. 5) may display a camera preview screen 1410 in a display area. When a shooting item 1420 is selected while a photo function is selected, the processor 530 may store the camera preview screen 1410.

A user may select an expansion function item (e.g., a sliding item 1430). As shown in 14002, the processor 530 may call an expansion view user interface (e.g., a pro item, an app item, a zoom item, a ratio item, a filter item) in response to the selection of the sliding item 1430.

As shown in 14003, the user may select a zoom item 1433. As shown in 14004, based on the selection of the zoom item 1433 and the transition of an electronic device from the first state to the second state, the processor 530 may display the camera preview screen 1410 in the first division area and display the first expansion preview screen 14101 corresponding to a first zoom function in the second division area.

According to an embodiment, the processor 530 may provide a first expansion preview screen at a preconfigured zoom magnification (e.g., 10 times). For example, the first expansion preview screen 14101 may be a preview image 1480 obtained by enlarging an image acquired from a camera by 10× zoom. The first expansion preview screen 14101 may include a separate save item 1450, a 1 to 10× zoom adjustment item 1460, and a cancel item 1470.

When a user additionally selects the zoom item 1433, as shown in 14005, the processor 530 may provide a second expansion preview screen 14102 corresponding to the second zoom function to the third division area, based on the reselection of the zoom item 1433, and the transition of the electronic device from the second state to the third state. For example, the second expansion preview screen 14102 may be a preview image 1490 obtained by enlarging an image obtained from a camera by 100× zoom. The second expansion preview screen 14102 may include a separate save item 1451, a 1 to 100× zoom adjustment item 1461, and a cancel item 1471.

The processor 530 may simultaneously store the camera preview screen 1410, the first expansion preview screen 14101, and the second expansion preview screen 14102 as separate images, based on the selection of the shooting item 1420 on screen 14005. The processor 530 may provide separately stored images 1495 to at least a portion of the camera preview screen 1410, based on the simultaneous storage.

Figure 15:
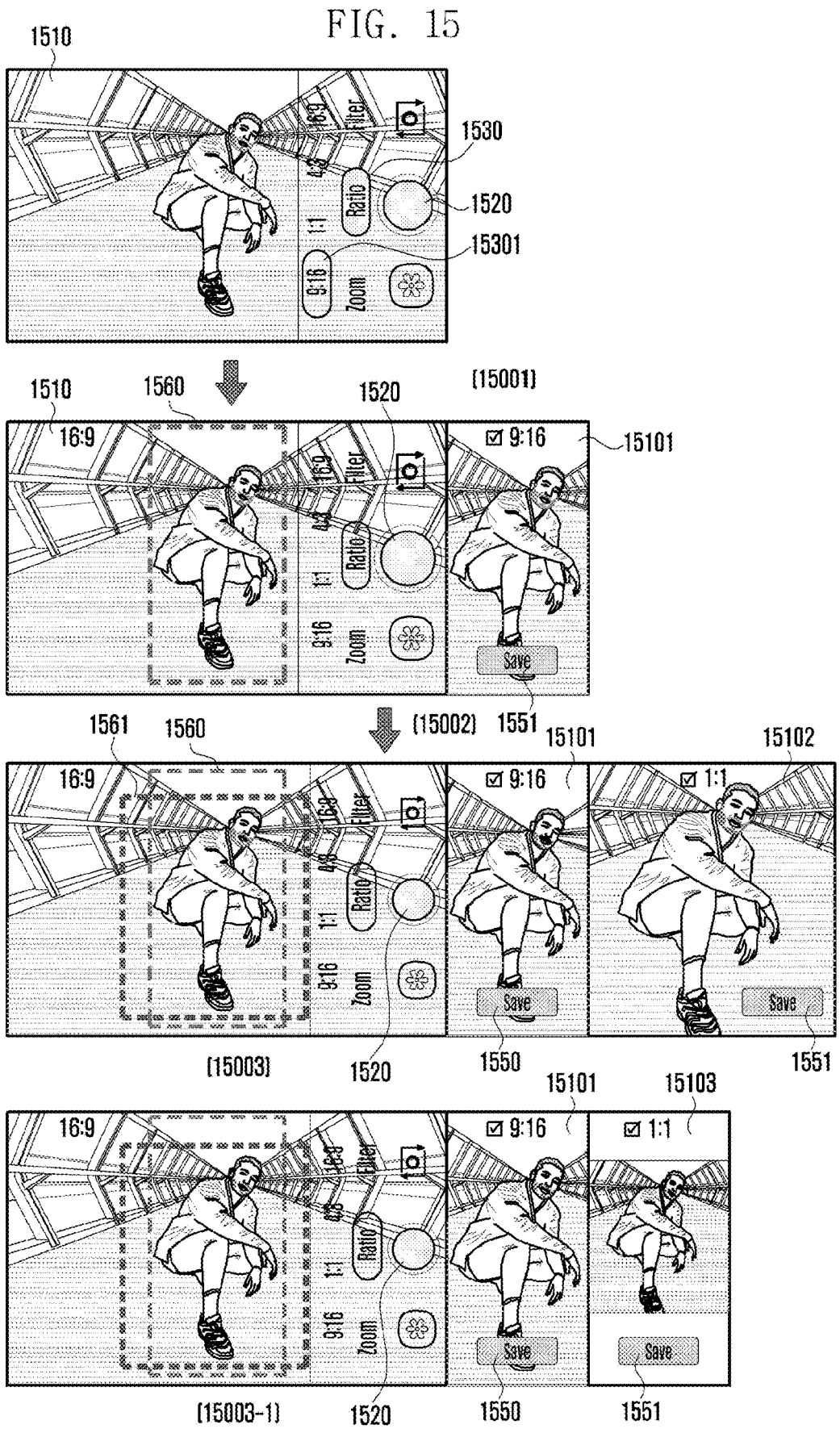
FIG. 15 illustrates expansion view user interface screens according to various example embodiments.

FIG. 15 illustrates expansion view user interface screens according to various embodiments.

Referring to FIG. 15, according to an embodiment, an electronic device (e.g., the electronic device 101 in FIG. 1) may support a function of varying a ratio of an expanded size of a display according to a selected expansion function.

According to an embodiment, as shown in 15001, in a first state in which a display (e.g., the display module 160 in FIG. 1 or the display 510 in FIG. 5) is not expanded, the processor (e.g., the processor 120 in FIG. 5 and the processor 530 in FIG. 5) may display a camera preview screen 1510 in a display area.

A user may select an expansion function item (e.g., a ratio item 1530). The processor 530 may call sub-items (e.g., 9:16, 1:1 4:3 16:8 items) related to the ratio item 1530 to the display in response to the selection of the ratio item 1530.

The user may select a 9:16 item 15301. As shown in 15002, based on the selection of the 9:16 item 15301, the processor 530 may maintain a current aspect ratio of a first division area, determine the expansion degree of the display such that a second division area has an aspect ratio of 9:16, and control the drive device in response to the determined expansion degree.

Based on the transition of the electronic device from the first state to the second state, the processor 530 may provide a camera execution screen 1510 to the first division area and provide a first expansion preview screen 15101 to the second division area having an aspect ratio of 9:16. The first expansion preview screen 15101 may be a preview screen obtained by cropping a 9:16 ratio area 1560 on a camera image.

Additionally or optionally, a user may select a 1:1 item 15302.

According to an embodiment, based on the selection of the 1:1 item 15302, as shown in 15003, the processor 530 may maintain the current aspect ratio of the first division area, determine the expansion degree of the display such that the second division area has an aspect ratio of 9:16 and the third division area has an aspect ratio of 1:1, and control the drive device in response to the determined expansion degree. The processor 530 may provide the camera execution screen 1510 to the first division area, provide the first expansion preview screen 15101 having an aspect ratio of 9:16 to the second division area, and provide a second expansion preview screen 15102 having an aspect ratio of 1:1 to the third division area. The second expansion preview screen may be a preview screen obtained by cropping a 1:1 ratio area 1561 on a camera preview screen 1410.

According to some embodiments, when a size of a display is limited in expanding to the size of a 1:1 aspect ratio, as shown in 15003-1, the electronic device may expand the display to the maximum or large area, and then provide, to the third division area, a screen 15103 displaying a reduced preview screen corresponding to the 1:1 ratio area 1561 and including a blank area (e.g., a pillar box, a letter box).

Figure 16:
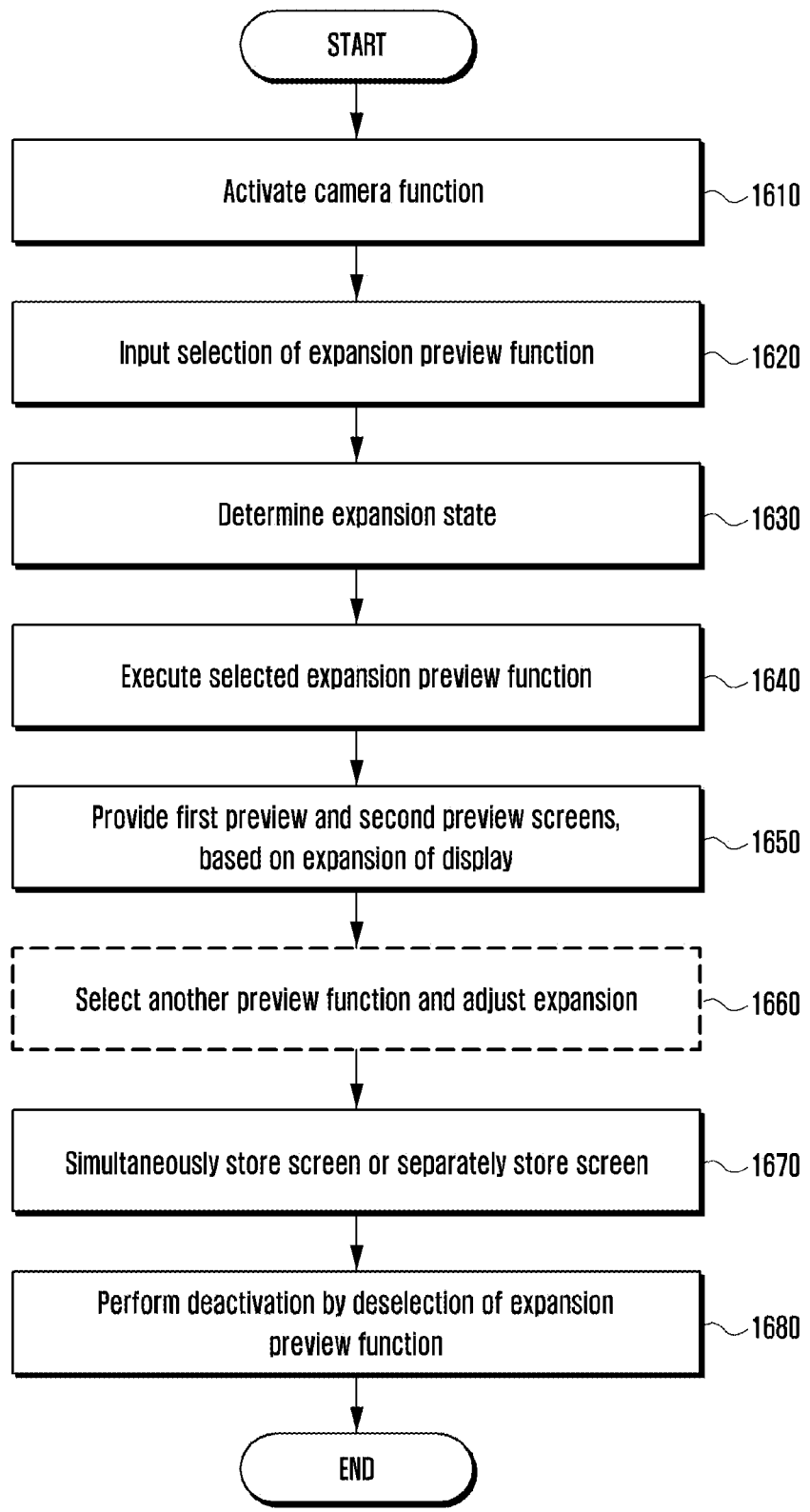
FIG. 16 illustrates a method for operating a camera view screen of a flexible electronic device according to various example embodiments.

FIG. 16 illustrates a method for operating a camera view screen of a flexible electronic device according to various embodiments.

Referring to FIG. 16, according to an embodiment, a processor (e.g., the processor 120 in FIG. 1 or the processor 530 in FIG. 5) of (e.g., the electronic device 101 in FIG. 1), may activate a camera function in operation 1610.

For example, when a user touches a camera app icon, the processor 530 may activate a camera application (e.g., a built-in camera application of an electronic device) in response to the touch, start a camera execution process, and display a camera execution screen on a display. In operation 1620, the processor 530 may recognize an expansion function selection input.

The processor 530 may detect selection (e.g., a touch or long touch) of an expansion function item (e.g., a sliding item) provided on the camera execution screen and provide an expansion view user interface to the display in response thereto. The expansion view user interface may include function items related to an expansion function that simultaneously provides a first preview screen (e.g., a camera preview screen) and at least one second preview screen (e.g., an expansion preview screen).

According to an embodiment, the processor 530 may determine an expansion function to be mapped according to the number or type of a selection input for the expansion function. For example, an expansion function item may be configured in a menu structure having depth (e.g., an upper menu→a lower menu). With regard to the expansion function, the processor 530 may determine an expansion function to be executed by integrating the selection input for the upper menu, the selection input for the lower menu, and the number of selection inputs.

In operation 1630, the processor 530 may determine a display expansion state in response to the selection of an expansion function item.

For example, the processor 530 may detect the contraction/expansion degree of a display (or a housing configured to accommodate a display), based on at least one sensor (e.g., a distance sensor, an expansion detection sensor) included in the electronic device 101. Alternatively, the processor 530 may determine whether the electronic device is in a closed state, an open state, or an intermediate state, based on data generated from a drive device or a sensor.

According to an embodiment, when the electronic device is in the closed state, the processor 530 may control a drive device to transition the electronic device to the open state, based on the selection of an expansion function item (e.g., the sliding item), thereby enlarging a display area where visual information is to be displayed.

According to another embodiment, the processor 530 may track whether the display area is expanded by a user's external force in a state in which an expansion function item (e.g., the sliding item) is selected, and determine the expansion degree of the display area.

In operation 1640, the processor 530 may execute an expansion function in response to the expansion of the display.

For example, the user may select a zoom function as an expansion function or an expansion camera app function.

In response to the expansion of the display, the processor 530 may divide the expanded display area into a first division area and a second division area. For example, when the first division area is a main area, the second division area may be designated as an expansion area, but the positions of the first division area and the second division area may be switched according to an expansion structure of the display.

According to an embodiment, when the electronic device has a structure capable of stepwise expansion (e.g., first expansion and second expansion), the processor 530 may perform control based on a user input such that the display area is further expanded. For example, based on an input for selecting another expansion function item or a sub-function related to the expansion function executed on the first expansion preview screen, the processor 530 may perform control such that the electronic device is expanded to a third size (e.g., the third state) from a state in which the electronic device is expanded to a second size (e.g., the second state). Based on the expansion to the third state, the processor 530 may add the third division area and provide a third preview screen related to the second expansion function executed in the third division area.

In operation 1650, the processor 530 may simultaneously provide a first preview screen (e.g., a camera preview screen) to the first division area and a second preview screen to the second division area.

The first preview screen may be a camera execution screen, and the second preview screen may be a preview screen corresponding to the executed expansion function.

A user interface related to a camera function may be provided on the first preview screen, and a user interface related to an executed expansion function may be provided on the second preview screen. In addition, a shooting items included in the first preview screen may support simultaneous shooting or simultaneous storage, and a separate save item included in the second preview screen may support separate storage.

In operation 1660, the processor 530 may detect an input for selecting another preview function or an input for adjusting expansion. According to an embodiment, operation 1560 may be omitted.

According to an embodiment, the processor 530 may switch the second preview screen to a preview screen according to the execution of another expansion function, based on an input requesting to switch the second preview screen to another expansion preview screen.

In operation 1670, the processor 530 may simultaneously store the first preview screen and the second preview screen or separately store the screens, based on the input of the simultaneous shooting function or the separate storage function.

In operation 1680, the processor 530 may deactivate an expansion function, based on the detection of an expansion function deselection input.

The processor 530 may transition the electronic device to the closed state according to the deactivation of the expansion function to terminate the display of the second preview screen, and perform control such that only the first preview screen is displayed.

According to an embodiment, when the electronic device is transitioned to the closed state by a user's external force while an expansion function is activated, the processor 530 may terminate the display of the second preview screen and display only the first preview screen.

The electronic device 101 according to various embodiments may display a first execution screen corresponding to a main function in the electronic device including a display having a variable display area, simultaneously provide the first execution screen and a second execution screen associated with the second execution screen, based on the execution of the expansion function and the expansion of the display area of the display, and support functions for simultaneous storage and separate storage. For example, when execution of an expansion function (e.g., filter application) is requested in a state where a gallery app execution screen is displayed, the electronic device may display a gallery image in the first division area in response to the expansion of the display, and display an image obtained by applying a filter to the gallery image in the second division area. Alternatively, when execution of an expansion function (e.g., background color change) is requested while the note app execution screen is displayed, the electronic device may display a first note screen in the first division area in response to the expansion of the display, and display a second note screen having a changed background color in the second division area.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
   a first housing;
   a second housing configured to be slidable with respect to the first housing;
   a driver configured to be driven to move the second housing with respect to the first housing;
   a display comprising a display area in which visual information is to be displayed, the display area being variable based on sliding of the second housing with respect to the first housing; and
   at least one processor, comprising processor circuitry, operatively connected to the display and the driver,
   memory storing one or more computer programs including computer-executable instructions that, when executed by the at least one processor individually or collectively, cause the electronic device to:
      control to display a first camera preview screen including a first preview image generated in real time by a camera on the display area;
      based on detection of a selection input of a first expansion function and expansion of the display area of the display from a first size to a second size, divide the display area of the second size into at least a first division area and a second division area; and
      control to display the first camera preview screen on the first division area and display a second camera preview screen including a second preview image on the second division area based on execution of the first expansion function,
      wherein the second preview image is generated in real time by applying the first expansion function to the first preview image generated in real time by the camera.

2. The electronic device of claim 1, wherein the instructions cause the electronic device to:
   determine an expansion state of the display in response to the selection input of the first expansion function; and
   in case of a first state in which the display is not expanded, perform transition to a second state in which the display is expanded, at least by controlling the driver, and in response to the transition to the second state, perform control such that the display area is expanded from the first size to the second size.

3. The electronic device of claim 1, wherein the instructions cause the electronic device to, based on a selection input and the number of inputs of expansion functions on the first camera preview screen, select a first expansion function to be executed, from among the expansion functions,
   wherein the expansion functions comprise at least one of: a zoom adjustment function, an external camera application function, an aspect ratio adjustment function, a filter application function, and a user designation function.

4. The electronic device of claim 2, wherein the processor is configured to, in response to detection of a deselection input of the first expansion function and/or a physical external force that reduces the display to the first size, deactivate the first expansion function and return the display area to the first size to display the first camera preview screen.

5. The electronic device of claim 1, wherein the first camera preview screen comprises expansion function items, camera function items, and a simultaneous shooting item,
   wherein the second camera preview screen comprises a separate shooting item, and
   wherein the expansion function items is configured to differently display at least one of text, indicator, color, and shape for informing that an expansion function is being performed, while the display is expanded, so as to be visually differentiated from the camera function items.

6. The electronic device of claim 5, further comprising a third housing,
   wherein the display is configured to have a structure in which the display is expandable from the second size to a third size in a case that the third housing moves in a first direction or a second direction by the driver; and
   wherein the instructions cause the electronic device to:
      add a third division area to the display area, based on detection of a selection input of a second expansion function on the first camera preview screen and expansion of the display area of the display to the third size; and
      perform control to display a third camera preview screen capable of being simultaneously stored and/or separately stored with the first camera preview screen and the second camera preview screen, via the third division area at least by executing a second expansion function.

7. The electronic device of claim 6, wherein the instructions cause the electronic device to:
   track an area of the display area varying according to a physical external force applied to the display, in a state in which a selection input of the first expansion function is detected;
   perform control to display the second camera preview screen and/or simultaneously display the second camera preview screen and the third camera preview screen based on the tracked area of the display area.

8. The electronic device of claim 6, wherein the instructions cause the electronic device to perform control to display a third camera preview screen at least by executing a second expansion function of a sub-item associated with the first expansion function.

9. The electronic device of claim 6, wherein the instructions cause the electronic device to perform control to display a third camera preview screen at least by executing a second expansion function different from the first expansion function.

10. The electronic device of claim 6, wherein the instructions cause the electronic device to, in response to detection of a selection input of the second expansion function, overlappedly add the third division area to the second division area displaying the second camera preview screen and display the third camera preview screen in a reduced form in the third division area.

11. The electronic device of claim 6, wherein the instructions cause the electronic device to, in response to detection of a selection input of the second expansion function, reduce the second division area to a 1/2 area, add the third division area to a 2/2 area, display the second camera preview screen in one area of the second division area, and display the third camera preview screen in another area of the second division area.

12. The electronic device of claim 6, wherein the instructions cause the electronic device to, based on a selection of the simultaneous shooting item, simultaneously store the first camera preview screen, the second camera preview screen, and the third camera preview screen as separate images and display the separately stored images on at least a portion of the first camera preview screen.

13. A method for operating a camera preview screen of a flexible electronic device, the method comprising:
   in response to execution of a camera function, displaying a first camera preview screen including a first preview image generated in real time by a camera on a display comprising a variable display area in which visual information is to be displayed;
   based on detection, on the first camera preview screen, of a selection input of a first expansion function and expansion of the display area of the display from a first size to a second size, dividing the display area of the second size into at least a first division area and a second division area; and
   displaying the first camera preview screen on the first division area and displaying a first second camera preview screen including a second preview image on the second division area based on execution of the first expansion function wherein the second preview image is generated in real time by applying the first expansion function to the first preview image generated in real time by the camera.

14. The method of claim 13, wherein the dividing into at least the first division area and the second division area further comprises:
   determining an expansion state of the display in response to selection of the first expansion function item; and
   in a case of a first state in which the display is not expanded, performing transition to a second state in which the display is expanded, and in response to the transition to the second state, expanding the display area from a first size to a second size.

15. The method of claim 13, further comprising, after displaying the second camera preview screen, based on detection of a selection input of a second expansion function item on the camera preview screen and expansion of the display to a third size, adding a third division area and displaying a third camera preview screen capable of being simultaneously stored and/or separately stored with the camera preview screen and the second camera preview screen, via the third division area based on execution of a second expansion function.

* * * * *